United States Patent [19]

Charvat

[11] Patent Number: 4,588,420
[45] Date of Patent: May 13, 1986

[54] METHODS OF MANUFACTURING ABRASIVE ARTICLES

[75] Inventor: Vernon K. Charvat, Bay Village, Ohio

[73] Assignee: Superior Finishers, Inc., Cleveland, Ohio

[21] Appl. No.: 399,592

[22] Filed: Jul. 22, 1982

[51] Int. Cl.$^4$ .............................................. B24D 11/00
[52] U.S. Cl. ........................................ 51/298; 264/71; 264/162; 264/219; 264/331.11; 523/139
[58] Field of Search ................... 51/295, 298; 523/139; 264/71, 162

[56] References Cited

U.S. PATENT DOCUMENTS

| | | | |
|---|---|---|---|
| 1,235,325 | 1/1917 | King . | |
| 1,403,416 | 1/1922 | Katzenstein . | |
| 1,959,059 | 5/1934 | McGill | 51/278 |
| 2,216,728 | 10/1940 | Benner et al. | 51/280 |
| 2,227,312 | 12/1940 | Mahler | 91/70 |
| 2,421,623 | 6/1947 | Kistler | 51/295 |
| 2,862,806 | 12/1958 | Nestor | 51/298 |
| 2,885,276 | 5/1959 | Upton, Jr. | 51/298 |
| 3,341,355 | 9/1967 | Gallagher | 117/113 |
| 3,377,411 | 4/1968 | Charvat | 51/298 |
| 3,520,666 | 7/1970 | Meyer | 51/295 |
| 3,535,832 | 10/1970 | Amero | 51/295 |
| 3,615,302 | 10/1971 | Rowse et al. | 51/295 |
| 3,850,589 | 11/1974 | Charvat | 51/296 |
| 3,850,590 | 11/1974 | Chalkley et al. | 51/298 |
| 3,864,101 | 2/1975 | Charvat | 51/298 |
| 4,128,972 | 12/1978 | Charvat | 51/298 |
| 4,150,955 | 4/1979 | Samuelson | 51/298 |

FOREIGN PATENT DOCUMENTS 53-60318  5/1978  Japan ................................ 523/139

OTHER PUBLICATIONS

Lee et al., Handbook of Epoxy Resins, McGraw-Hill Book Co., New York, 1967, p. 25-3.

Primary Examiner—James Derrington
Attorney, Agent, or Firm—Renner, Otto, Boisselle & Lyon

[57] ABSTRACT

New molded products and methods of manufacturing the same are described. More particularly, the molded products comprise thermoset resins and intimately dispersed inorganic solid particles, and the method comprises in its broadest sense, preheating a thermosetting organic resin and a catalyst for the resin to a temperature sufficient to reduce the viscosity of the resin and catalyst to that of a very fluid liquid, and also preheating discrete inorganic solid particulates prior to mixing of the particulates with the fluid resin-catalyst mixture. Such regulated preheating of the resin, catalyst and particulates results in improved wetting of the particulates with the resin-catalyst mixture and in the release of air bubbles during the mixing operation thereby resulting in molded products having improved properties, particularly products wherein the resin is in relatively unstressed and unflawed condition. Various molded products, including filters, molds, and abrasive articles such as grinding wheels are described.

7 Claims, 25 Drawing Figures

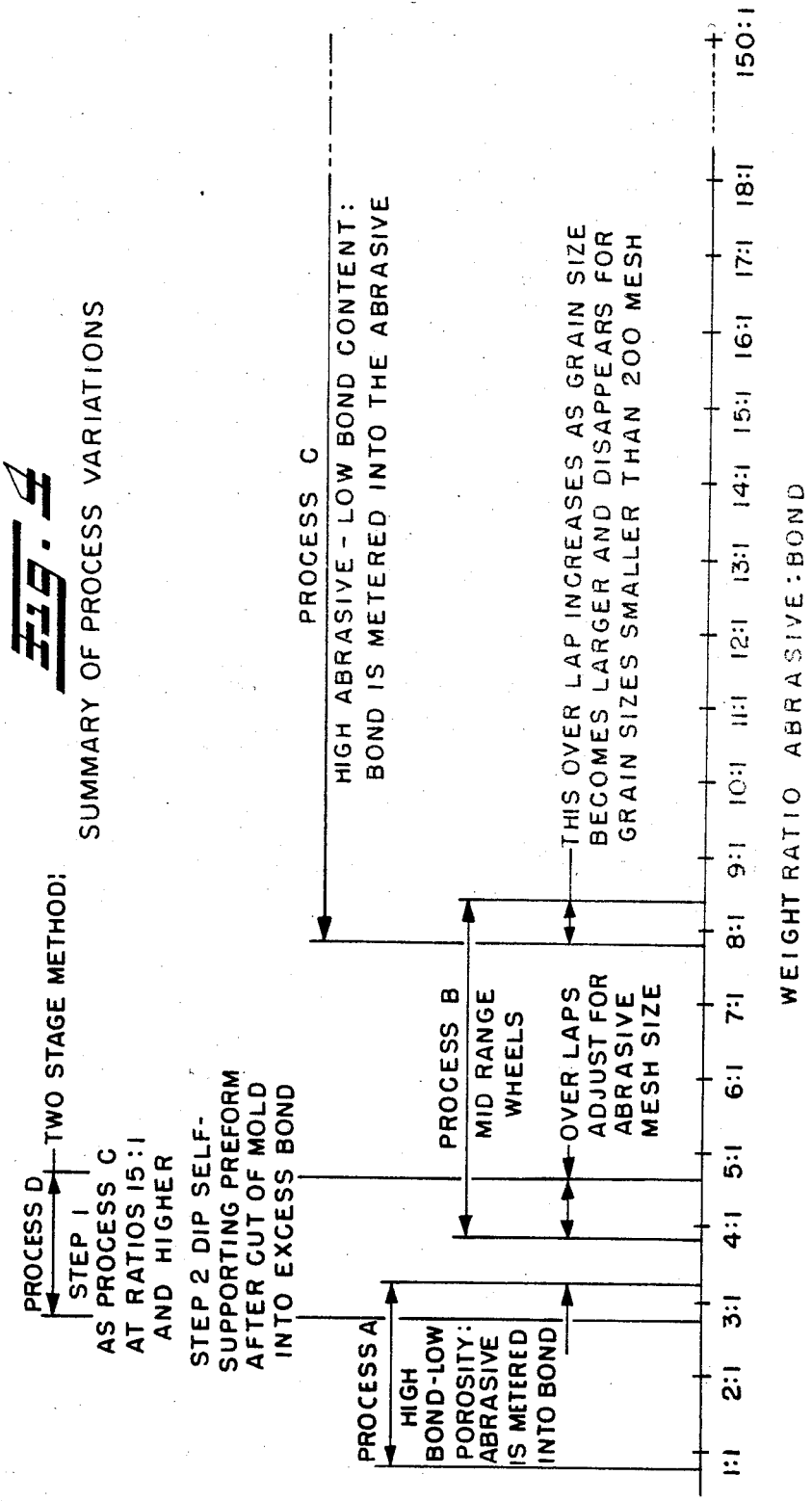

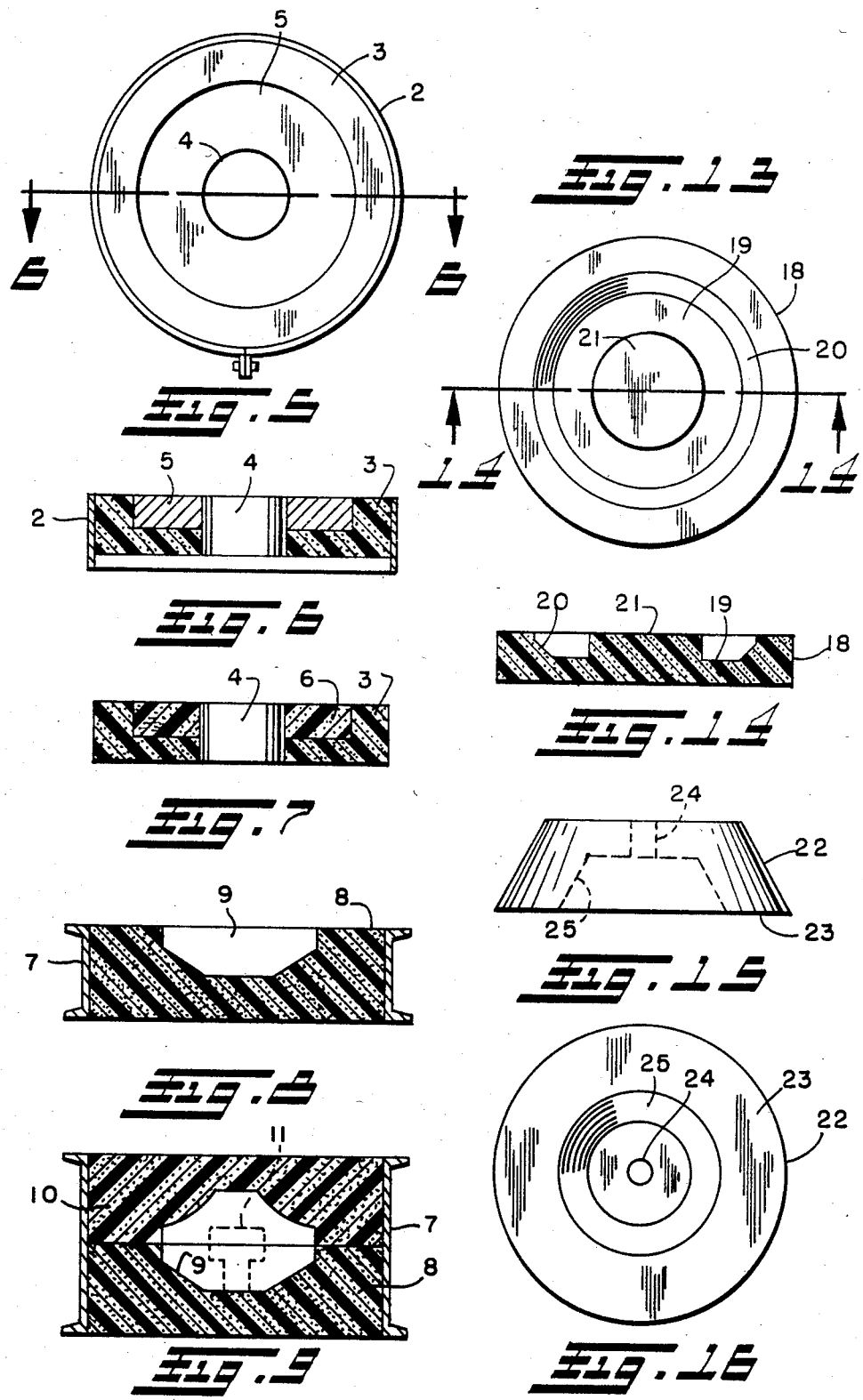

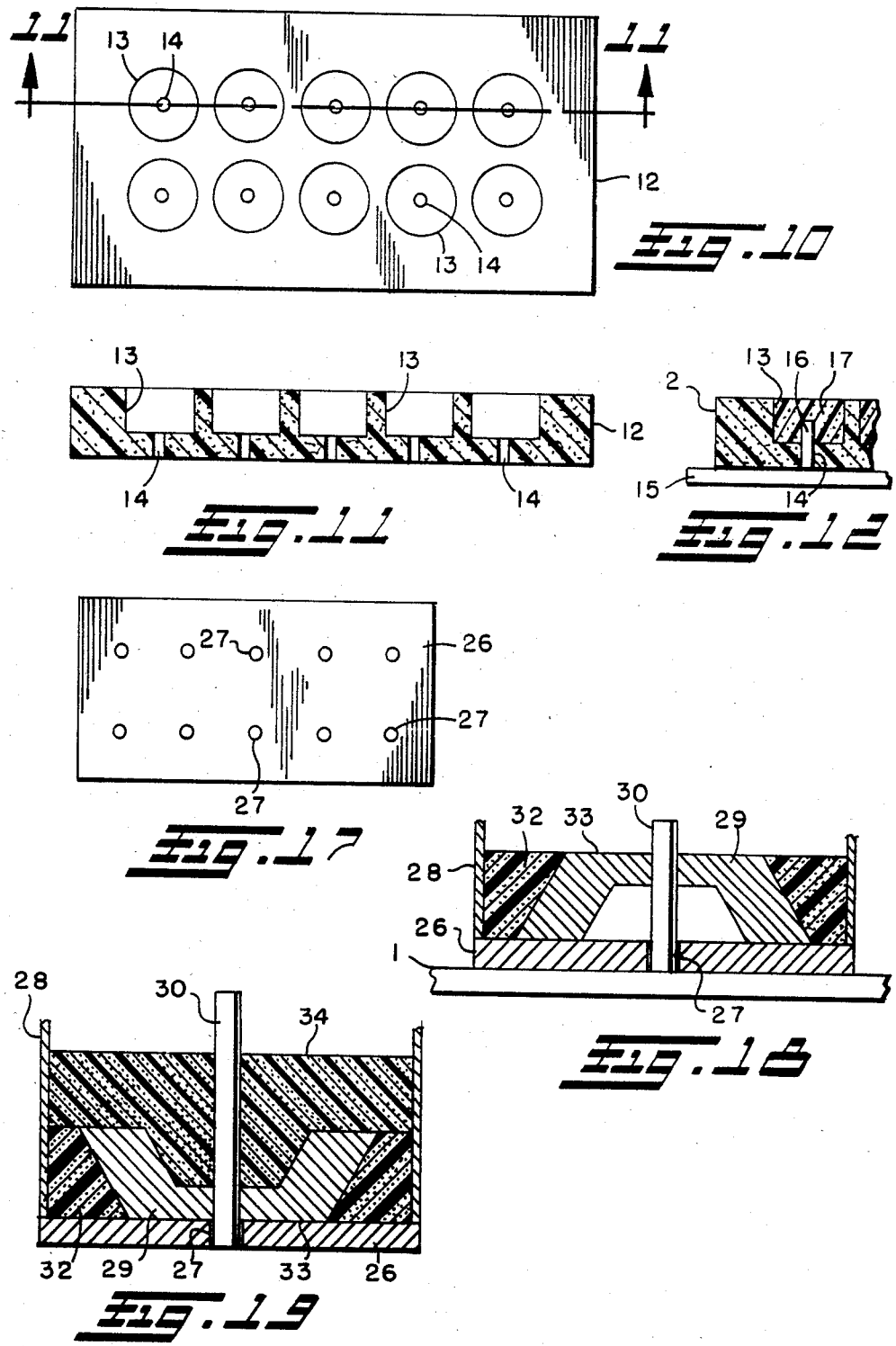

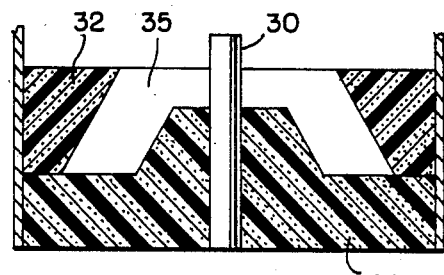
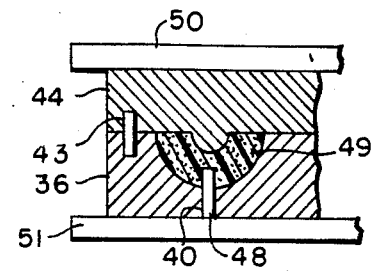
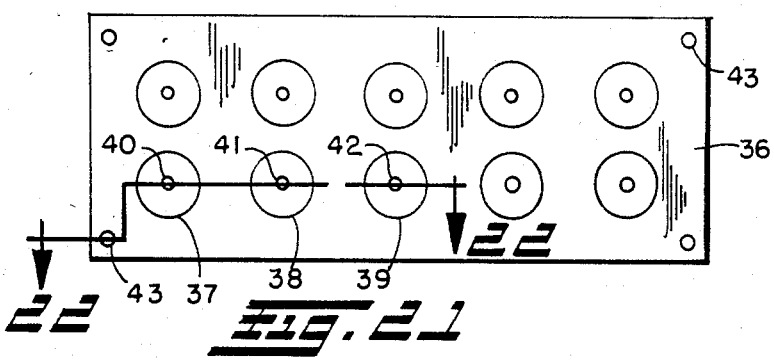
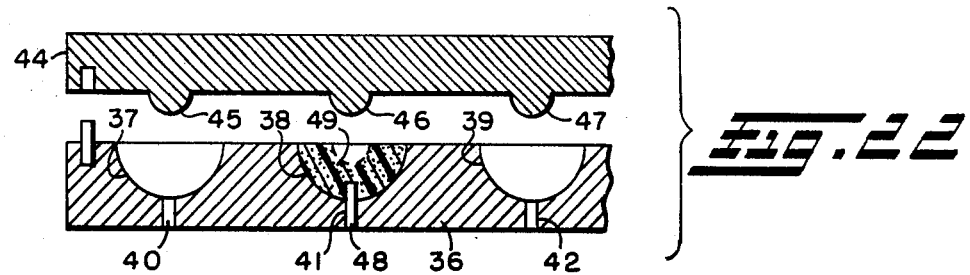
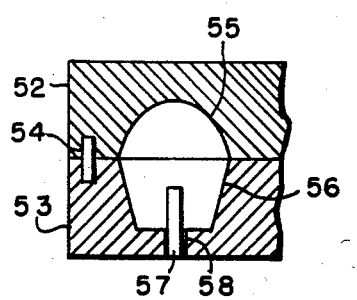
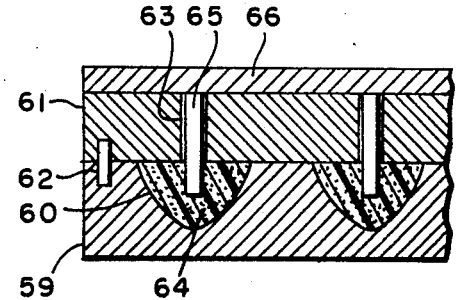

METHODS OF MANUFACTURING ABRASIVE ARTICLES

BACKGROUND OF THE INVENTION

The prior art is replete with suggestions for methods for preparing articles which comprise thermosetting resins and inorganic particulate materials. Many techniques have been developed for controlling the physical properties of such articles depending on the anticipated end-use. Molded articles comprising resins and inorganic particulates have been utilized as abrasive articles such as grinding wheels, segments and discs, polishing or finishing tools which may be in the shape of wheels and discs, and honing tools.

Articles comprising resins and inorganic particulates also may be formed in shapes which are suitable for use as molds for casting various materials including plastic and metal castings. Such articles also can be prepared containing controlled and graded pore sizes, and such articles are useful as filter elements.

Accordingly, although the emphasis of this disclosure, particularly from the standpoint of best modes presently known to the inventor, is on abrasive articles, there is no intention or reason to limit the specific end use of the novel articles of this invention.

Abrasive articles such as grinding wheels are commonly produced by ramming discrete abrasive particles or grit in a suitable mold together with a ceramic material which is subsequently fused at a very high temperature to bond such particles together. These generally are referred to as ceramic or vitreous grinding wheels. Grinding wheels so produced are often fragile, out of balance and non-uniform in density of abrasive grain. When resin bonding agents have been employed in the formation of grinding wheels (generally referred to as resinoid wheels), many of the same problems have been encountered, and the bond to the abrasive grains has been imperfect and flawed, with voids caused by entrapped air and absorbed moisture, and physical stresses in the cured resin binder resulting in weaker retention of the grains under conditions of use.

Foamed resins also have been employed in the preparation of abrasive articles which evince certain practical advantages, but nevertheless have the unavoidable concommitant of reducing the abrasive grain density and hence the number of cutting points at the working face of the tool. As abrasive machining has grown in industrial importance, the demand has increased for abrasive tools, and especially grinding wheels, which are capable of extremely rapid cutting action while still maintaining a true tool profile to ensure dimensionally accurate geometry of the work surface.

One method known in the prior art for obtaining the desired high concentration of abrasive grains in the grinding articles involves mixing the grains and the binder, and forming the article under extremely high pressure. This method, though permitting the formation of articles containing a high concentration of grain, does not provide any control of the grain arrangement nor particularly with respect to the uniformity of the dispersion of the grains in the binder. In other prior art methods, mixtures of grain and resin are centrifuged to concentrate the grain at the periphery of the mold with only a minimal amount of resin in this area for bonding. The grains in such prepared wheels are in initimate contact with one another often resulting in a build-up of stress concentration and heat on grinding which weakens the wheel and causes metallurgical damage. Examples of prior art patents describing foaming procedures for preparing abrasive tools include U.S. Pat. Nos. 2,885,276; 3,377,411 and 3,850,589.

Nestor, U.S. Pat. No. 2,862,806 has described a procedure wherein abrasive particulates are added in dry condition to the mold and the mold is rotated at about 1750 rpm while the resin binder, heated to about 120° C. is mixed with hardener and poured through a central access into the mold and onto the abrasive at room temperature. While continuing the centrifuging, the mold is heated causing the contents of the mold to be heated to thermoset and shrink the replicate mass in the mold so that removal from the mold is simplified. The articles prepared in this matter are observed to contain variable abrasive/bond ratios from the central core continuously radially outwardly. Little control of heating or of the ratio of abrasive particulate to bond appears to be practical with the method.

The application of heat to the constituents utilized in the formation of grinding wheels, either individually or in combination at various stages of the processes have been suggested in the prior art. For example, Upton in U.S. Pat. No. 2,885,276 suggests that wetting of the abrasive grain by the resin can be improved when the resin is in the form of a continuous homogeneous liquid of low viscosity and surface tension. The patentee suggests the use of heated molds under certain conditions and certain applications as well as control of the temperature of the mineral grain and base resin in order to facilitate handling of the reactive mix from the mixing vessel to the mold. The patentee also suggests that control of the base resin temperature is a factor which aids in the control of viscosity and of uniformity of wetting of the abrasive grains. In column 5, lines 6-34, the desirability of controlling the temperature of the abrasive or polishing agent before introduction into the resin mix is discussed. Temperature control of the various ingredients is described as being critical to efficient foaming of the composition as the desired abrasive product is prepared.

In U.S. Pat. No. 3,850,589, there is a suggestion in column 12 beginning at line 19 that the resin component is normally heated to a suitable temperature so that the resin can be pumped and dispensed more readily. In column 12 of the same patent, beginning at line 26, there is a suggestion that the ingredients may be mixed at room temperature or may be preheated to reduce viscosity and increase the rate of reaction. A similar disclosure is contained in U.S. Pat. No. 3,377,411. Although the prior art foamed abrasive articles have exhibited good working characteristics, such grinding articles have not been suitable for all applications, and have not been the final answer to the problems of the grinding industry, probably because of the presence of the voids, channels and other discontinuities resulting from the foaming process. Such discontinuities, when contained in the resin bond, must be considered as flaws in the cured article.

Accordingly, there continues to be a need in the industry to provide molded articles, and particularly abrasive articles, having the desired (generally high) grain density at the working face with such grains being exceptionally securely held by a substantially unflawed resin bond and yet allowing interstices to be present in amounts compatible with the function the article is to perform. Such a condition is not met by the utilization of the general knowledge that heat improves the wetting process, especially when thermosetting plastics are also very sensitive to drastic reduction in pot life when so conditioned. The concept of this invention is self-defeating until it is carried to an extreme where unexpectedly the very low viscosity of the bond and the super-receptivity of the abrasive combines to unexpectedly shorten mixing time so that shortened pot life loses its importance. Such references in the art as that heat can be utilized to improve wetting do not reach or even remotely suggest the new concept of this invention where the two phase approach calls for two levels of control—once to achieve supermixing and wetting in spite of pot life considerations and second to ameliorate this first unstable condition by controlling the temperature via heat sink conditions and subsequent heat additions to allow a normal polymerization of the bond. Even the results obtained are unexpected. With this new process it is possible to make a full range of products from extremely low bond ratio to high bond ratio products where complete wetting between the bond and the abrasive occurs, with the bond films relatively free from even small cells, air spaces, and voids which weaken such structural members, and with such a percentage of interstices as are considered desirably sufficient even to make filters. The differences between interstices and void space, frothiness, cells or other defects in the bond films being suddenly recognized as counterproductive in the manufacture of such a product as grinding wheels where high strength (safety) must be balanced with the conditions of the grinding work to be done. Prior art techniques also have been deficient in permitting the preparation of a broad spectrum of grinding articles containing, when desired, abrasive to bond ratios ranging from about 1:1 to about 150:1.

SUMMARY OF THE INVENTION

A method for preparing molded articles comprising thermoset resins and inorganic particulate materials is described which comprises the steps of (a) preheating a thermosetting organic resin and a catalyst for the resin to a temperature sufficient to reduce the viscosity of the resin and catalyst to that of a very fluid liquid, (b) preheating discrete inorganic solid particulates to a temperature sufficient to remove at least some of the moisture, (c) adding such heated particulates to a heated resin and catalyst mixture with agitation to wet such particulates with the resin-catalyst mixture and release gas bubbles to form a flowable mixture free of particulate agglomerations.

(d) discharging said flowable mixture into an open mold permitting continued release and escape of gas bubbles from such resin-catalyst mixture, and (e) curing the mixture in the mold to a solid article of desired shape.

An important and critical feature of the method of the invention is the use of regulated preheating of the various ingredients to a sufficiently high temperature to facilitate complete and thorough wetting of the inorganic particulates and to effect release of entrapped air from the resin system and mixture of the resin system with the inorganic particulate material prior to curing. Optionally, and preferably, the mold into which the flowable mixture of resin and particulate material is poured also is heated to prevent or at least minimize thermal stock to the resin-particulate mixture which could otherwise cause the resin bond in the cured article to contain undesirable stresses. The introduction of the preheated resin-catalyst mixture into the heated mold also results in further wetting of the particulates and evolution of occluded gases prior to initiation of the curing. Articles which can be prepared in accordance with the method of the invention include grinding tools, molds and filter elements.

BRIEF DESCRIPTION OF THE DRAWINGS

In the annexed drawings:

FIG. 4 is a schematic outline of four variations in the process of the invention;

FIG. 5 is a top plan view of a grinding wheel mold and pattern in accordance with the invention;

FIG. 6 is a vertical diametral section taken on the line 6—6 of FIG. 5;

FIG. 7 is a view similar to FIG. 5 but with such pattern removed and the grinding wheel constituents filling the resultant mold cavity;

FIG. 8 shows a foundry drag mold and flask in transverse cross-section;

FIG. 9 shows an assembled foundry mold in similar cross-section;

FIG. 10 is a top plan view of a one piece multiple cavity mold for small mounted grinding wheels;

FIG. 11 is a vertical transverse section taken on the line 11—11 of FIG. 10 through a row of mold cavities;

FIG. 12 is a similar fragmentary section showing a mold cavity with a mandrel in place and the cavity filled with the wheel composition;

FIG. 13 is a top plan view of a mold for a drill pointing grinding wheel;

FIG. 14 is a vertical transverse section taken on diametral line 14—14 of FIG. 13;

FIG. 15 is a side view of a standard cup shape abrading wheel (or pattern therefor);

FIG. 16 is an end view of the working face of the wheel of FIG. 15;

FIG. 17 is a top plan view, on a relatively reduced scale, of a mold pattern plate having a plurality of holes therethrough to receive studs or mandrels to position a corresponding number of such patterns thereon;

FIG. 18 is a vertical section through one such pattern assembly showing the mold composition surrounding the same;

FIG. 19 shows the assembly of FIG. 18 now inverted and with the complementary mold part also poured in place;

FIG. 20 shows such assembly returned to the FIG. 18 attitude, but with the pattern now removed to provide the mold cavity ready for filling;

FIG. 21 is a top plan view of a lower elastomeric mold part containing a plurality of mold cavities;

FIG. 22 is a fragmentary vertical transverse section taken on the line 22—22 of FIG. 21, and also showing a corresponding section of the upper rigid mating mold parts;

FIG. 23 is a similar fragmentary vertical section showing one such cavity filled and the mold closed;

FIG. 24 is a generally similar sectional view of two other mated mold parts each of which defines a portion of a mold cavity; and FIG. 25 is a fragmentary section of a mold assembly for mounted points requiring removal from the mold cavity in the direction of the shank or mandrel.

DESCRIPTION OF THE PREFERRED EMBODIMENTS

In the manufacture of the articles of this invention, the geometry of the article, the mass of the article, the ratios of particulate to resin, the size of the particulates and the exothermic characteristics of the resin cure are all material variables upon which the quality of the final product and its conceptual end use are dependent. In general, the method of the invention employs heat control to produce a sequence of physical conditions which are effective for producing molded articles having the desired properties. In summary, the object of the method of the invention is to maximize the heat energy employed in the process to obtain an improved abrasive and thermosetting resin mixture by complete wetting of the particulates and reduction of entrapped air, and then managing the sequence of events in subsequent steps by absorbing and/or releasing heat to the reacting mass to control the polymerization or curing process at a favorable rate.

Method of Manufacture

Figure 1:
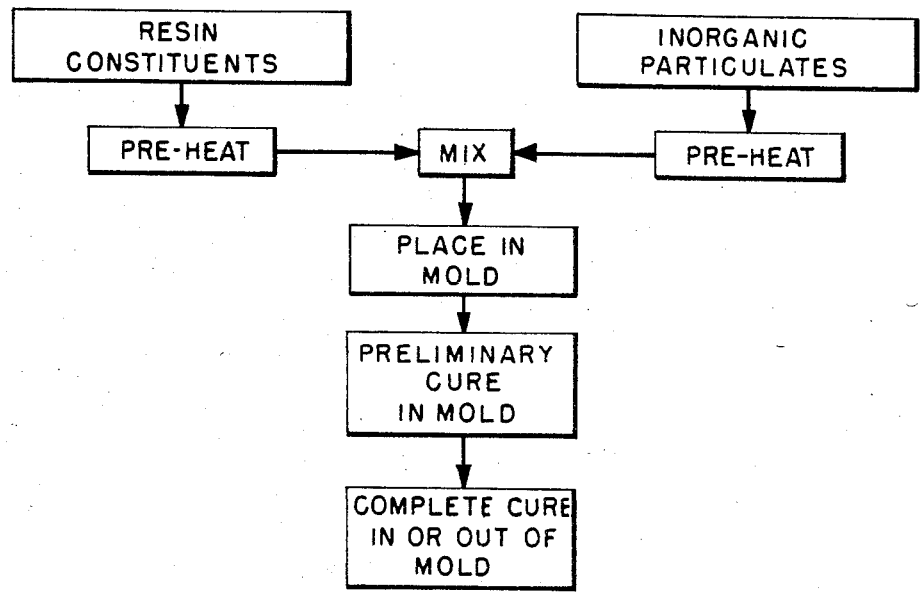
FIG. 1 is a simplified flow diagram indicating typical operational steps of the production of an article in accordance with the invention.

A preferred method of making the improved molded articles of the present invention is described generally in FIG. 1. By way of introduction, it has been discovered that in order to obtain the advantages of the method of the invention and the improvement in the quality of the products of the novel process of this invention, it is essential to increase the temperature of the total system which includes the inorganic particulate material, the thermosetting polymeric resin and, optionally, the mold cavity to such a temperature level that the viscosity of the polymeric binder is at an optimum liquidity.

Optimum liquidity of the total system is, in effect, dependent upon the mesh size of the particulates, the ratio of particulate to resin, the total mass of the resin plus particulate, the total batch weight and the type, weight and geometry of the mold. A temperature at which one obtains optimum liquidity of any given polymeric bond not only is dependent upon the above factors but also dependent upon the characteristic exotherm temperature of the resin cure, the amount of heat generated during the exotherm and the duration of the exotherm. The exotherm exhibited by the resins utilized in the method of the invention result from heat generated in the hot mass after the mixture of resin and particulate materials has been poured into the hot mold and the catalyzed polymerization reaction begins. It is during this period that additional quantities of heat energy are both absorbed by and dissipated from the mass and the mold.

The method of the present invention involves a balanced energy input into the system with due regard for the above factors so that there is a maximum of energy input into the system to reduce the viscosity of the bond and to maximize reduction in the interfacial tension between particulate surfaces and resin to obtain as near to perfect wetting and dispersion of the particulate in the resin without prematurely initiating the exothermic reaction (chemical cross-linking and setting of the bond). Accordingly, while initial high temperatures are advantageous in reducing viscosity, wetting of the particulates and facilitating dispersion of the particulates in the resin, it is critical to obtaining improved molded articles that the exotherm does not raise the temperature level of the mass in the mold to the temperatures where scorching and shrinkage of the mass occurs.

Taking into consideration the above mentioned factors, a preferred method of making the improved molded articles of the present invention will be described generally with reference to FIG. 1. Resin constituents, generally comprising a thermosetting resin and a catalyst or hardener for the resin are preheated to a temperature sufficient to reduce the viscosity of the resin and catalyst mixture to that of a very fluid liquid. The inorganic particulates which are to be mixed with the thermosetting resin constituents likewise are preheated to a temperature which is sufficient to remove at least some of the moisture from the particulates and to raise the temperature of the particulates to a level which will be sufficient to avoid a chilling of the resin constituents when mixed therewith. When both the resin constituents and the inorganic particulates have been preheated to the desired degree, they are mixed together with agitation to wet the particulates with the resin-catalyst mixture and to release air bubbles thereby forming a flowable mixture free of particulate agglomerations and containing a minimum of entrapped air or other gases.

The flowable mixture of resin constituents and inorganic particulates thereafter is placed in a mold while permitting continued release and escape of gas from the resin-catalyst mixture. Preferably the mold is an open mold. The flowable mixture of thermosetting resin, catalyst and inorganic particulates contained in the mold is then given a preliminary cure at a temperature selected from a consideration of the nature of the thermosetting resin followed by a complete cure at a higher temperature. The final complete cure of the article can be effected either within or out of the mold since the shape of the article is determined and fixed during the preliminary cure. Optionally, with some articles, it is desirable to allow the flowable mixture contained in the mold to gel in the absence of any externally applied heat prior to effecting the preliminary cure. In this manner, the critically important exotherm observed in the curing of the thermosetting resin occurs under mild and controlled conditions minimizing any deleterious effect on the resulting resin bond.

In general, the desirable objectives of the invention are accomplished when the thermosetting resin initially is preheated to a temperature sufficiently high to reduce its viscosity substantially, and more particularly to reduce the viscosity of the resin (and catalyst if present) to that of a very fluid liquid. A viscosity of less than 10 centipoises generally is preferred and viscosities of less than 5 centipoises are even more preferred. In general, the viscosity of the preheated thermosetting resin may be "water-like".

The temperature to which the thermosetting resin is preheated to reduce the viscosity to the desired level will depend upon, in particular, the nature and type of thermosetting resin. Such temperatures can be determined by heating the individual thermosetting resins until the desired viscosity is obtained. Generally, a thermosetting resin will be preheated to a temperature of at least 70° C. and generally from temperatures ranging from about 70° C. to about 230° C. or higher. The reduction in the viscosity of the resin (and optionally the catalyst when present) is desired since reduced viscosity, together with the elevated temperature, facilitate removal of occluded or entrapped gases, including water vapor and air which may be tightly bound to the particles. The reduced viscosity of the resin also results in an improvement in the subsequent wetting of the solid particulates by the resin.

The method of the invention also contemplates the preheating of the inorganic solid particulates to a temperature sufficient to remove at least some of the moisture and occluded gases, including water vapor which may be tightly bound to the surfaces of the particulate solids. As the particulates generally are not heat sensitive within the useful temperature ranges of the thermosetting resins used in the invention, particulates can be heated well above the optimum temperature of the preheated thermosetting resin and used as heat transfer media to bring the resin bond to a higher desirable temperature. In an alternative, but not preferred, embodiment, the solid inorganic particulates can be heated to a very high temperature and mixed with the resin constituents which have not been given a separate preheating treatment thereby utilizing the heat contained in the particulates to raise the temperature of the unheated resin to a level sufficient to reduce the viscosity of the resin-particulate mixture to a viscosity of a very fluid liquid as required in the method of the invention. This procedure may be particularly useful when preparing high abrasive to bond articles since the large amount of heated abrasive will be sufficient to raise the temperature of the small amount of resin to the desired level.

Although it is desired to preheat the inorganic particulates prior to mixing with the resin constituents, the temperature of the inorganic particulates should not be so high as to cause an undesirable rise in the temperature of the subsequent mixture to a level above the critical resin temperatures which might result in premature or too rapid curing of the mixture. Generally, the temperature of the preheated inorganic particulates will be above 70° C. and may be as high as 240° C. or higher.

The preheating of the solid inorganic particulates serves to drive off adsorbed moisture which otherwise may produce vapor and undesirable voids in the molded article, and it also prevents thermal shock to the curing binder material (resin plus catalyst) which would otherwise occur when such heated resin binder contacts the inorganic particulates in a thin film filling the small interstices between the particles. In other words, such particulates comprise a heat sink which can interfere with proper curing of the heated resin binder by locally chilling the latter with consequent build-up of internal stresses in the cured and set bonding resin. Such stresses interfere with proper and secure grain retention, as do any excessive occluded gas bubbles which prevent adequate wetting and bonding to the particles. By preheating the abrasive, the production of an unflawed resin bond is facilitated.

The preheated resin constituents and inorganic particulates are mixed preferably by adding the heated particulates to the preheated resin constituents with continuous rotary mixing, using a slowly revolving mixer which does not tend to beat or incorporate gas into the mixture. While the pot life of the heated resin and curing agent mixture is, of course, limited, their low viscosity permits the inorganic particulates to become thoroughly wetted thereby and uniformly incorporated therein. Generally, it is possible and desirable to continue with the stirring operation for a further appreciable period even after such uniform mixture has been obtained to ensure completion of the particulate wetting and removal of occluded gas. This continued stirring operation can be continued until there is an apparent increase in the viscosity of the mixture which indicates that the curing action has begun. The mixture, at that point, should be discharged into an appropriate mold.

In another preferred embodiment, it has been found desirable to preheat the mold prior to introduction of the resin, catalyst and particulate mixture so that the mold does not act as a chill when the mixture is poured therein. Moreover, the introduction of the heated mixture into a heated mold results in further wetting of the particulates and evolution of gas prior to initiation of curing. Accordingly, the mold may be preheated to a temperature of at least about 60° C., and generally may be heated to a temperature which is approximately equal to the temperature of the resin-particulate mixture introduced therein.

When the mixture of resin constituents and inorganic particulates is discharged into the mold, the particulates will settle and concentrate densely together, and this action can be facilitated and enhanced by vibrating or jolting the mold (preferably vertically), and the still liquid resin constituents lubricating the interfitting of such particles to a condition preferably of greater density than the dry packed density of the paticulates. A slight excess of liquid resin constituents desirably may be employed so that such particles are concentrated in the lower body of the mixture contained in the mold, and a thin substantially abrasive-free layer of resin accumulates at the upper surface of the mixture. The excess resin assists in such concentration by increasing the mobility of the particulates as they become more concentrated. In the case of a grinding or polishing wheel thus molded, the layer of excess resin will subsequently be machined off from the cured and finished article.

During the foregoing operational steps, and also at least during the earlier stages of subsequent curing, it is desirable to leave the mold uncovered. Not only is a mold cover unnecessary when the upper surface of the molded article is later to be machined, it has been found advantageous to expose such upper surface for an extended period of time to permit continued release of any occluded gases, especially when the mold is vibrated.

While proper mixing and stirring minimizes occluded gas bubbles due to this operation, nevertheless, the usually highly irregular surfaces of the particulates tend to carry adsorbed moisture and to hold minute pockets of air. The preheating of the resin constituents and the particulates greatly reduces this problem and facilitates much more perfect wetting of the particles by the binder, but, as indicated, still further improvement may be obtained by vibration of the open mold and employment of an excess (for example more than 2.5% and preferably from about 5 to 10% by volume) of resin binder.

Figure 2:
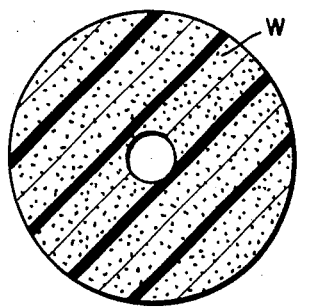
FIG. 2 is a side view of a typical grinding wheel such as may be produced in accordance with the invention.
Figure 3:
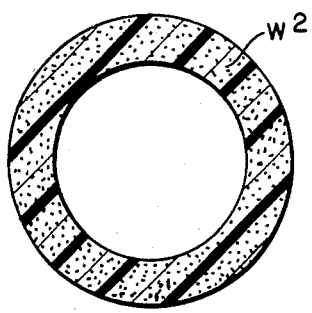
FIG. 3 is a side view of an annular grinding wheel suitable for steel mill roll grinding and the like in accordance with the invention.

The working surface of cured abrasive articles prepared in accordance with this invention such as the working surface W and $W^2$ of the grinding wheels illustrated in FIGS. 2 and 3 may be diamond dressed so that the surface is immediately fully effective in operation without requiring a break-in period.

The Synthetic Resin Binder Constituents

Synthetic resin binder constituents (resin and catalyst or hardener) useful in accordance with the invention are selected for their ability to attain a low viscosity, even water-like, upon being preheated prior to mixing with a supply of discrete particulate material. As mentioned above, such lowering of the viscosity of the resin by preheating greatly facilitates such mixing but would be detrimental to the integrity of the ultimate bond if the particulates were not also preheated prior to mixing to drive off adsorbed and absorbed moisture and to avoid thermal shock and an irregular cure of the resin. This latter problem is particularly acute when the amount of abrasive relative to the amount of the binder is especially high and the binder is in the form of extremely thin layers coating the abrasive completely and yet filling the minute interstices between the grains in the finished article or leaving them present in an amount as needed to provide the desired article performance. The thermosetting resins embrace a class of pre-polymers which are known to cross-link in the presence of catalysts or hardening agents and are thereafter thermoset. Preferably, the resin used in accordance with the invention can be heated to reduce the viscosity of the resin temporarily to a viscosity of less than 10 centipoises and as low as 2 centipoises or lower.

Examples of thermosetting resins whose viscosity can be reduced to less than 10 centipoises by heating without detrimental effect include epoxy resins, urethane resins and phenolic resins. For all but specialized products having carefully controlled physical qualities to meet particular end uses, epoxy resins provide a broad spectrum and selection and have been most practical. These resins are available commercially as substantially 100% non-volatile, low vapor pressure liquids and solids from which group it is preferred to make selections to avoid the fire and explosive hazards of the organic solvent solutions of normally solid epoxy resins and non-reactive solvents which are known in the polymer art. Moreover, as most organic solvents are volatile and very inflammable, the presence of solvents is undesirable since they introduce shrinkage problems in molding accurate shapes, and the organic solvents, if not completely removed prior to curing, will result in foaming and the formation of voids, air bubbles and other discontinuities which are considered undesirable in the molded articles of the invention. Accordingly, the use of liquid state polymers having flash points as high as practicable in view of the energy input in the inventive process are preferred. Solid and semi-solid resins also are contemplated when handling equipment permits.

The epoxy resins utilized in the invention may be any one of a number of well known resins characterized by the presence therein of an epoxide group, i.e.

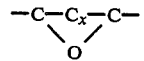

wherein x is zero or a small whole number. Such resins have either a mixed aliphatic aromatic or an exclusively non-benzenoid (i.e., aliphatic or cycloaliphatic) molecular structure. The mixed aliphatic-aromatic epoxy resins generally are prepared by the well-known reaction of a bis-(hydroxy-aromatic)alkane or a tetrakis-(hydroxyaromatic)alkane with a halogen-substituted aliphatic epoxide in the presence of a base such as, for example, sodium hydroxide or potassium hydroxide. Examples of the halogen-substituted aliphatic epoxides include epichlorohydrin, 4-chloro-1,2-epoxy butane, 5-bromo-1,2-epoxy pentane, 6-chloro-1,3-epoxy hexane and the like. In general it is preferred to use a chlorine substituted terminal alkylene oxide (terminal denoting that the epoxide group is on the end of the alkyl chain).

Examples are the bis-(hydroxyphenyl)-propane; 2,2-bis-(1-hydroxy 4-naphthyl)-propane; 2,2-bis-(o-hydroxyphenyl)propane; and 2,2-bis-(p-hydroxyphenyl)propane. The latter compound is commonly referred to in the trade as "Bisphenol A."

Epoxy resins of the type described above are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350–400 and an epoxide equivalent of about 175–210.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent.

Another group of epoxy resins are available from Furane Plastics Inc., Los Angeles, Calif. under the general trade designations EPIBOND and EPOCAST. For example, EPIBOND 100A is a one component epoxy resin powder available from Furane which is curable to a hard resin in the absence of any hardener.

For purposes of this invention, the liquid forms of epoxy resin are preferred. These liquid forms normally comprise very viscous liquids requiring some degree of heating to permit withdrawal from storage containers. Certain "D.E.R." resins obtainable from Dow Chemical Company and "Epotuf" liquid epoxy resins obtainable from Reichhold Chemicals Inc. are examples of such resins preferred for employment in accordance with the invention. A particularly preferred "EPO-TUF" liquid epoxy resin is the undiluted medium high viscosity #37-140 having an epoxide equivalent weight of 180–195, a viscosity (ASTM D445) of 11,000–14,000 cps at 25° C., and a Gardner Color Maximum of 3. This is a standard general purpose epoxy resin.

A variety of types of hardeners or catalysts for accelerating the polymerization and cross-linking reaction are known for epoxy resins. Examples include polyfunctional aromatic amines, polyamides and organic acid anhydrides. A particularly preferred curing agent for the epoxy resins utilized in the present invention is the "TONOX" hardener for epoxies produced by Uni-Royal Chemical Division of Uni-Royal, Inc. TONOX is a blend of aromatic primary amines, more particularly, 4,4'-diaminodiphenyl methane or methylene dianilin (MDA) plus related polymeric amines. This hardener is a brown, waxy solid having a low melting point and is completely liquid at 80° C. This material also is a desirable hardener because it can undergo repeated melting and solidifying cycles without becoming ineffectual.

The resin utilized in the method of the invention also may be a urethane resin, often referred to as polyurethane. The polyurethanes are well known compositions and are formed by the reaction of a diisocyanate with an active hydrogen-containing composition such as the polyesters and polyethers. It is preferred to use a polyester containing three hydroxyl groups which can subsequently be cross-linked with the diisocyanate to form the finished rigid polyurethane. Similarly, cross-linkable polyethers of triols which provide suitable sites for cross-linking reactions may be utilized. The diisocyanates with which the active hydrogen-containing composition is reacted are generally aromatic or aliphatic. Examples of aromatic diisocyanates include 2,4-toluene diisocyanate, 2,6-toluene diisocyanate, 4,4'-diphenylmethane diisocyanate, 1,5-naphthalene diisocyanate, 5-nitro-1,3-phenylene diisocyanate, and xylylene-1,4-diisocyanate. Alkylene diisocyanates such as tetramethylene diisocyanate, hexamethylene diisocyanate and mixtures thereof also are useful.

A variety of urethanes and polyurethanes are commercially available and useful in this invention. One family of prepolymers are available from Uniroyal Chemical under the general trade designation "VIBRATHANE". Polyurethanes within this family are available in both the ether and the ester type. The catalysts (curing agent) for these polyurethanes also are available from Uniroyal. A preferred curing agent for polyether and polyester TDI terminated VIBRATHANE is diamine 4,4'-methylenebis(orthochloroaniline), generally referred to as MOCA. The polyurethanes terminated with MDI usually are cured with diol extenders such as 1,4-butane diol. A specific example of a polyether-TDI polyurethane useful in the method of the invention is "VIBRATHANE B-602". An example of a polyester-TDI polyurethane available from Uniroyal is "VIBRATHANE 6008", and an example of a polyether-MDI polyurethane available from the same company is "VIBRATHANE B-635". VIBRATHANE B-602 is a preferred prepolymer for use in the method of the invention since it is a slow reacting prepolymer and has been found useful in blends with epoxy resins. It has been found that the VIBRATHANE liquid polyurethane prepolymers can be blended and cured with low molecular weight liquid epoxy resins resulting in materials having unique flexibility and impact resistance. Aromatic diamines are satisfactory curing agents for the mixed polymer blends. Accordingly, the "Tonox" curing agent described above can be used as well as MDA (methylene dianaline, MOCA, m-phenylenediamine, etc.)

Phenolic resins also may be useful in the invention. These resins generally are prepared by reacting phenol with an aldehyde such as formaldehyde in the presence of an alkaline or acid catalyst. There are two types of phenolic resins available and these are generally designated as single-state (resol) and two-stage (novolac) condensation products. A higher mole ratio of formaldehyde to phenol is used to form a resin which is ultimately thermosetting. That is, under continuous application of heat, the condensation process continues and forms an insoluble, infusible material. No additional aldehyde or cross-linking agent is required. The one-stage type of resin formed by this and similar procedures shows a fast cure rate and good chemical resistance.

The two-stage or novolac resins are commonly reaction products of phenol and a reduced mole ratio of formaldehyde under acidic conditions, and require the addition of a hardener or cross-linking agent such as hexamethylenetetramine. Specific examples of commercially available phenolic resins include those liquid phenolic resins available from the Union Carbide Plastics Company under the trade designations BRLA 2761 and BRLA 2760.

The present invention, as illustrated below, also contemplates the use of mixtures of resins such as a mixture of an epoxy and a urethane resin. Such mixtures may be useful in designing molded articles having particular and unique characteristics.

The Particulate Material

In general, any discrete inorganic particulate solid can be used in the production of the molded articles of the invention. More particularly, the inorganic particulate material may be any of the discrete abrasive particles commonly employed in the production of grinding wheels, polishing wheels, hones and the like. The type, grit size and amount of particulate material may be varied to produce a wide variety of useful products.

Examples of abrasive particles which can be utilized in the method of the invention include fused alumina, sintered alumina, silicon carbide, diamond emery, garnet, talc, pumice, sand, and the like. When the molded article prepared in accordance with the invention is a foundry mold, molding sands of various grades may be used. It is well known, of course, to use sand, silicon dioxide or quartz grains in various sizes for abrasive end uses as well. Fine sands also are useful as the inorganic particulate material when the end use of the article formed in accordance with the invention is a filtering element.

One novel aspect of the method of the invention is the ease with which extremely fine abrasive particles in the order of 1200 mesh, and even particles of a diameter under 4 microns such as sericite (3.5 microns in diameter) may be uniformly and intimately mixed with and incorporated into the thermosetting resin. Coarser particles as large as 10 mesh, but generally as low as 24 mesh, can be utilized in the method of the invention.

In addition to the novel aspect wherein a wide range of particle sizes can be intimately and uniformly incorporated into the thermosetting resin, the method of the invention unexpectedly can be utilized to incorporate a broad range of concentrations of particulate materials in a thermosetting resin. For example, the weight ratio of particulate material to thermosetting resin plus hardener may be as low as 1:1 or as high as 150:1 or higher. Preferably the weight ratio will be below 50:1 and more preferably below 30:1. Previously, attempts to prepare molded articles containing weight ratios of abrasive to resin plus hardener of less than 4:1 and greater than 7:1 either have been only partially successful or extremely difficult to attain. By the method of the present invention, it is possible and feasible to incorporate either low amounts of abrasive or very high amounts of abrasive into the thermosetting resin and still obtain uniformity of dispersion and desirable concentration of the abrasive particles to form, for example, abrasive articles having the desired abrasive and grinding qualities. It is believed that these desirable results are attained because of the unique features of the method of the present invention wherein all of the ingredients are heated to especially elevated temperatures which results in complete wetting of the abrasive particles and subsequent thorough and uniform mixing of the grains in the very liquid thermosetting resin. Moreover, since most if not substantially all of any occluded gases are removed from the resin-abrasive mixture prior to molding, undesirable voids and discontinuities which would generally reduce the weight ratio of abrasive to resin bond in the final product are reduced to a minimum.

One of the advantages of the method of the invention can be described in terms of bulk or pack density of the particulate materials. The term "bulk" or "pack" density of abrasive grains is well known and understood in the art. The bulk density of abrasive articles (grams/unit volume) is obtained by free fall or equivalent procedure. The bulk density of various grains is available from the producers thereof as an average, or it can be determined easily for any specific batch by experimentation.

In the present invention, the abrasive content of the molded article may be substantially in excess of 100% of the bulk or pack density of the particular abrasive employed. Moreover, the abrasive particles may constitute in excess of 60% of the abrasive-resin body, by volume. In some cases, it may be desirable to utilize several different abrasive materials and/or several different mesh sizes blended together.

In addition to the abrasive particles, various discrete inert filler materials such as mica, graphite powder, iron pyrites, quartz, titanium dioxide, cryolite, feldspar ceruscite, olivine, gypsum, clay, etc. may be included in the flowable mixtures molded in accordance with the invention to provide specific qualities when needed. The filler is added hot at the temperature of the resin or of the resin-catalyst mixture. In this way the air surrounding each particle can be bled off so that it does not remain in the finished grinding wheel taking up space and thereby displacing abrasive or bond or both. The preferred practice is to heat the filler 25° to 75° F. hotter than the resin or binder. Particle sizes as small as 3.5 microns easily disperse into the binder or resin very quickly with significant release of air. When the quantity of mix is sufficient, the addition of filler is accompanied by very strong release of bubbles. The volume of filler is proportioned to the binder volume with equal volumes being easily accommodated.

The abrasive particles (and filler materials when present) are preheated, in accordance with the method of the present invention, to a temperature sufficient to remove at least some of the moisture or other components contained on the surfaces of the commercially available particles prior to mixing with the thermosetting resin. Accordingly, heating of the particulate above 100° C. prior to dispersion in the thermosetting resin aids in driving off moisture and occluded gases which are detrimental to the preparation of the molded articles of the invention.

While the curing action in the method of the invention is exothermic in character, the abrasive content of the flowable mixture contained in the mold is generally so high that the exothermic reaction does not greatly affect the temperature of such mixture, the abrasive particles serving as a heat sink. In many of the abrasive articles prepared in accordance with the present invention, the amount of bond employed is much less than in prior art resin bonded and foamed resin bonded tools of the same dimensions due to the high grain density. But, despite the high temperatures to which the thermosetting resin constituents may be preheated, and the exothermic nature of the curing reaction, scorching of such resin binder constituents, and exceedingly rapid curing are avoided due to the heat sink effect of the abrasive particles and the mold. Generally, the early stages of the cure take place (for a 2-hour period, for example) without need for further external heating.

However, when the ratio of particulate to resin plus hardener (binder) is low, and the exotherm of the resin is high, good practice may indicate a cooling step to reduce the temperature of the particulate-resin dispersion subsequent to the completion of the mixing of the dispersion and before addition of the hardener or catalyst to the bond. Rapid cooling may be required in some instances where the catalyst is present and the resin is characterized by a short "pot-life". It has been found that generally, the initial setting of the mixture in the mold be controlled at such a temperature that setting or gelation to a self-supporting shape will occur in from 1 to 4 hours. As mentioned above, gelation can be effected in the absence of any externally applied heat. Control of the gelation time provides a means for shrinkage control, prevention of internal stress development and internal charring due to excessive heat development in large mass molded articles.

In the molding or curing step, control of temperature has three principal aspects. Initially, addition of the heated mixture to a heated mold permits continued evolution of gases and continued wetting of the particulates prior to the beginning of the gelation phase. If the mold is cold or insufficiently heated, it acts as a heat sink and may slow polymerization to an impractical rate. If the mold is too cold, the particulate-bond-catalyst mixture contained therein will re-develop viscosity levels which will result in voids in the final molded article. Thus, it is recommended and preferred that the mold be heated to a temperature of at least about 70° C. which will assist in preventing incomplete development of the molded mass. It also will assist in reduction of the more costly time of mold use by the increased production rates thereby made possible.

On the other hand, the mold should not be heated to an extremely high temperature without careful consideration of the total mass of the material being molded, the geometry of the mold, the particulate to resin ratio, and the size, weight and heat capacity of the mold itself. These factors, as previously indicated, are material to heat radiation losses, and if not properly controlled, may permit the exotherm to raise the total temperature of the system above safe practice level.

A general rule of thumb developed thus far indicates that with aluminum oxide and silicon carbide particles, and relatively intermediate levels of particulate:bond ratios, the following guidelines apply. In the initial heating step, where the amount of particulate to be dispersed in the thermosetting resin is of an amount equivalent to 10 pounds or less of the total of particulate and bond, the temperature of the initial dispersion can be at the high end of the optimum liquidity of the bond and is comfortably within the range of 120°-175° C. At 100 pound particulate in the dispersion mass, it is preferred to keep the temperature nearer to about 94°. When the particulate mass exceeds about 200 pounds, then the quantity of heat carried into the dispersion of particulate and resin by the particulate is great enough that the combined temperature may exceed safe levels unless cooled after the mixing is complete and before addition of the catalyst or hardener.

Based upon present knowledge, where the heated particulate and heated resin are mixed, a safe temperature range guide for the mass of the particulate plus resin mixture after dispersion is shown in the following Table I:

TABLE I

| Weight of Mass (pounds) | Temperature of Mass (°C.) |
| --- | --- |
| 10 or less | 120–177 |
| 50 | 93–120 |
| 100 | 88–102 |
| 200 | 77–88 |

If the temperatures of the mass are increased above these temperatures in the mixing step, then pre-cooling before addition of the catalyst or hardener may be a desirable consideration.

When the particulate-resin-catalyst mixture is discharged into a heated mold, the guideline for determining the temperature at which the mold should be heated (depending upon its specific heat) may be guided by the relationships shown in the following Table II:

TABLE II

| Weight of Mold (pounds) | Temperature of Mold (°C.) |
| --- | --- |
| 25 or less | 107–177 |
| 50–100 | 107–121 |
| 500 | 93–107 |
| 750 | 77–93 |
| 1000 | about 65 |

The heated mold tends to compensate for normal heat losses and maintains the polymerization rate active. In many instances, the mold and the mixture contained in the mold are maintained at a temperature of about 120° C. for a period of up to about 4 hours to set the shape. At this point, the mold may be emptied and the shaped article which is removed from the mold can be given a final cure at a temperature of about 175° C. for an additional 2 to 4 hours. Since the resin curing exotherm principally occurs during the initial period of time the mixture is in the mold, the essential quality control of temperature is most vital only when the mixture of particulate, resin and catalyst is in the mold.

Initial Use of an Excess of Thermosetting Resin

The use of an excess of the thermosetting resin as described previously ensures the presence of an adequate amount of resin to fill the interstices between the abrasive grains, and such excess also affords a sufficient volume of the liquid thermosetting resin to facilitate the mixing operation with complete uniform wetting of the grains and avoidance of agglomerations. It serves also to facilitate the settling and concentration of such grains into a dense body which may be at a concentration which is greater than the normal pack density of such material.

The abrasive particles are added gradually to the thermosetting resin binder constituents, with stirring, or in a succession of batch additions, likewise with stirring. It obviously is relatively easy to mix in the first of such abrasive, and more difficult to incorporate the last. The use of an excess of binder ameliorates this situation.

While an excess of about 2.5% by volume of the resin binder will afford appreciable benefits, an excess of about 5% by volume normally is employed. The use of an excess of greater than 10% normally is unnecessary and therefore wasteful. Such excess resin subsequently normally appears and accumulates at the upper surface of the abrasive article in the open mold. If the article is a grinding wheel, for example, this non-abrasive resin layer can be machined off by a Blanchard machine, but if the article is a block hone or a segment for a segmental grinder, for example, where only one side face will engage the work, such substantially non-abrasive resin layer may be retained and comprise the under surface of the article in use.

A further benefit which is obtained from the use of such excess binder is that when additional bubbles arise after the mixture is in the mold, some of such bubbles may accumulate in the superficial resin layer which will subsequently be machined away or comprise a non-operative portion of the abrasive article.

The settling and concentration of the abrasive particles in the liquid resin binder constituents may be considerably facilitated by vibration or jolting of the mold. In this manner, high grain density in the resulting abrasive article can be achieved while avoiding the disadvantages of prior art grinding wheels where the grains have been forcibly rammed and crushed in the mold. Such latter method, with the resulting direct grain-to-grain contact, produces a rigid and relatively brittle article, and often uneven balance in the grinding wheel. In contrast, by the method of the present invention utilizing an excess of thermosetting resin, the grains normally retain a very thin film of non-brittle binder therebetween even in their most direct contiguous portions, as well as filling the remaining interstices therebetween. The abrasive tool can accordingly absorb impact shocks and stresses far better than the prior art tools despite its dimensionally stable overall characteristics under conditions of use.

Effect of Extended Stirring

An unexpected and beneficial phenomenon has been observed when stirring the preheated thermosetting resin binder constituents and the preheated abrasive grains to mix the same, even when no substantial excess of binder is present. When the last of the abrasive has been added, the resultant mixture initially is thick and relatively stiff, but as stirring continues a considerable quantity of occluded gas bubbles off and the agglomerations of grain are dissipated. It would normally seem that time has arrived to place the mixture in the mold. However, if the now uniform mixture is nevertheless stirred for an additional appreciable period of time (for example 2 to 5 minutes) such mixture itself appears to liquefy and become soupy in consistency. As soon as such condition is reached, the mixture is poured into the mold before consequential gelation can begin.

While it is difficult to account for such transformation, it would appear to result from a combination of several circumstances. As additional occluded gases escape, the liquid binder more effectively wets and coats the grains, facilitating their ability to slip past one another. Furthermore, the initial reaction of the resin and curing agent appears to enhance the lubricating effect thereof for a relatively brief period before gelation commences.

Delayed Addition of Catalyst

Under some circumstances, particularly when producing a very large abrasive article comprising a relatively low proportion of abrasive to resin, it may be desirable to delay the addition of the catalyst or hardener until after the resin has been mixed with the abrasive. Accordingly, the epoxy resin, for example, may be preheated to a temperature as high as 150° and even 175° C. to render it extremely liquid prior to mixing in the similarly preheated abrasive grain. If the hardener also were incorporated at this stage, the exothermic reaction might cause scorching of the interior of the molded article or at least abnormal shrinkage thereof. Instead, such incorporation may be delayed until the resin and abrasive have been thoroughly and uniformly mixed and then cooled down substantially, for example, to normal curing temperature such as 120° C. At this point, the hardener may safely be mixed in, and the mixture discharged into a mold for curing in the normal manner. This procedure appears to be beneficial particularly when using abrasive grain of particularly large mesh size. This modified procedure also appears to be desirable when producing thin grinding wheels having, for example, an abrasive to resin plus hardener ratio of from 1.9:1 to 2.6:1 by weight.

Grain Concentration

As previously indicated, it is generally preferred to cause the abrasive particles to settle in the liquefied resin until densely concentrated, thereby producing a strong dimensionally stable abrasive article with a large number of cutting points at the working surface, and a minimal amount of exposed bond therebetween. To effect such concentration to the pack or bulk density of the particular abrasive employed, or even to still greater densities without crushing or ramming of the grains into a direct rigid engagement, mold vibrators of the type commonly employed on foundry molds are employed. Alternatively, the mold may be jolted or jogged by means of an eccentric effective to lift and drop such mold a vertical distance of about ¼ inch at a frequency of about 40 times per minute. The term "vibrate" is used herein and in some of the claims as intended to include such procedures.

Optional Pre-Wetting of Abrasive

While the resin bond utilized in the present invention is heated drastically to significantly reduce the viscosity to that of a very fluid liquid such as water, and more generally to a liquid having a viscosity of less than 10 centipoises to facilitate the removal of occluded gases and improve the wetting of the abrasive grains, other procedures may be utilized in some instances to further facilitate the wetting of the grains. As mentioned previously, it is believed that preheating of the abrasive prior to mixing with the preheated resin also facilitates wetting. Additionally, in some instances, it is desirable to pre-wet the abrasive with a wetting agent or a solvent to improve subsequent wetting of the abrasive by the resin bond. The selection of the wetting agent and/or solvent will depend upon a proper balance of the solvent flash rate and the gel rate of the mixed resin. The solvent should consist essentially of medium and low boiling solvents such as xylene, methylethylketone, toluene, certain alcohols and acetates such as butyl acetate and ethyl acetate. Mixtures may be advantageous in certain instances. The catalyst or hardener utilized in such instances should be chosen to provide a slower gelation (among other things) such as occurs with the Tonox catalyst used in the present invention which does not result in instantaneous gelation.

Use of Lubricants

The incorporation of materials exhibiting self-lubricating properties into the abrasive-resin bond mixtures described above results in molded articles exhibiting self-lubricating properties resulting in reduced friction between the work and the tool. Thus, such tools reduce the heat at the point of contact and so reduce the grinding tool's tendency to "burn" the work. This technique is practical particularly with the high particulate-low bond mixtures. The addition of solid lubricants such as TFE (tetrafluoroethylene)graphite or molybdenum disulfide into the resin (epoxy) will allow the lubricating material to be within the bond films themselves, exactly at the point of need. In Process D, the lubricants can be incorporated at stage 1 or stage 2 or both.

The amount of lubricant additive is based largely on bond content. The additive should be within the range of 20% by volume or less with an optimum amount being about 5 to 10% by volume of the resin bond volume.

Variations in Methods of Invention

The methods of the invention discussed above and more fully below may be classified for ready reference into four different processes as summarized in FIG. 4. These four processes are identified as Process A, Process B, Process C and Process D. The four processes are based upon various ranges in the weight ratios of refractory particulate to organic bond across a probable spectrum of operability of the processes which has been disclosed above as being from 1:1 to about 150:1.

When the weight ratio of particulate to bond is between 1:1 to about 3.2:1, Process A is most generally applicable. (As can be seen from FIG. 4, a number of overlaps occur and will be mentioned below).

Process B is particularly useful for preparation of molded articles where the particulate to bond ratio is in the range of 3.5:1 to about 8:1. For molded articles wherein the weight ratio is greater than 8:1 and as high as 150:1, Process C generally is most useful, but there is noticed overlap with Process D. Many of the formulas utilized in the preparation of molded articles which is made possible by Process C have not heretofore been practical to manufacture because of the very small amount of liquid bond in relation to the very large volume of particulates. Processes C and D generally fall within the weight ratio of about 10:1 to about 50:1 or higher. Process D as indicated in FIG. 4 comprises two steps.

Referring to the overlap noted in FIG. 4 relating primarily to Process B, and a small segment of Process A, there is an overlap between about 2.7:1 and about 3.2:1 of Process A with Process D, and between about 7.1:1 and about 8.4:1 relating to Process B and C.

These overlaps are related to the grain size of the refractory particulate, and the overlap increases somewhat as grain size selection approaches the largest grit sizes (smallest numbers) and disappears when the grain sizes become smaller than about 200 mesh. Adjustments resulting from a consideration of the grit sizes most often relate to the temperature of the mixture in the mold more than in variation in Processes A-D.

Process A generally embraces weight ratios of from about 1:1 to about 3:1 which generally correspond to volume ratios of about 1:3 to about 1:1. These ratios are of little interest in the manufacture of porous articles such as, for example, filter elements. However, excellent specialized abrasive products of very low void content for surface finishing having high strength and resilient nature can be made in this range depending on the size of the grit, the quality of the grit and the nature of the organic bond. In Process A1, it is preferred to heat the particulate and meter it while hot slowly into the heated bond whose viscosity is reduced by heating to an optimum liquidity.

Optimum liquidity of the bond is defined with some difficulty in practice, but not in theory. Some thermosetting organic bonds, even among the preferred epoxy resin class, are solid at room temperatures but liquefy at relatively low temperatures. Other organic bonds are liquid at room temperature but of very high viscosity and, hence, flow poorly and wet the surfaces of the refractory particulate with difficulty. Still other thermosetting organic resins are overreactive particularly in the presence of the corresponding hardener or catalyst and cannot safety be subjected to excessive temperatures for extended time intervals. As a general proposition, and as mentioned above, optimum liqudity is that viscosity which is very close to that of water, particularly below 10 centipoises, without beginning to increase in viscosity due to the cross-linking of the resin at such a rate that the manufacturing step of wetting and dispersion of the hot particulates by the liquid resin cannot be completed, and the transfer of the flowable mixture to the hot mold cannot be completed before the viscosity increase of the mixture renders this latter step difficult to achieve.

Specifically in the practice of Process A formulations, a major portion of the resin material is heated to about 95°–150° C., and after the particulate is heated to a temperature in excess of 60° C., the particulate is slowly metered with mixing into the preheated resin. When wetting and dispersion have been effected, the remaining heated resin and catalyst may be added to bring the temperature back down to about 95° C., particularly if experience indicates that the exotherm (due solely to the bond reaction) occurs too soon or creates excessive temperature in the mold. However, the temperature of the mold should not chill the fluid mixture as it is poured or transferred into the mold, and preferably the mold is heated to prevent this chilling effect. A preferred range of temperatures during the dispersion or wetting of the surface of the particulates by the resin is greater than 70° C. and most often between about 90° and 200° C.

Process B is recommended when the formulation includes somewhat higher concentrations of particulates as compared to the formulations of Process A, but nevertheless, the particulate to bond relationship as compared to Process C can be characterized as low particulate-high bond. In particular, particulate to bond ratios of from about 4:1 to about 8:1 by weight, and from about 5:4 to about 5:2 by volume are illustrative of this range. Abrasive products (grinding wheels) within this range are most often designed for heavy duty use in abrasive machining where there is high energy input and heavy stock removal. In Process B, the total heated particulate at a temperature of between about 90° and 225° C. is rapidly metered with good shear rate into the total bond heated to a temperature at least about 90° C. After completion of the mixing, the mixture may be cooled to a lower temperature, the hardener or catalyst mixed into the composition, and the hot admixture preferably immediately transferred into the mold which is heated usually in a range of from 60° to 175° C. Temperatures as high as about 200° C. have been used where the exotherm can be held down in temperature to a level to inhibit and prevent scorching and shrinkage.

Process C is more useful as the particulate to bond weight ratio of the molded article exceeds 7.5:1. Generally, the process is applicable to formulations wherein the particulate to bond weight ratio is in the order of from 8:1 to as high as 150:1. Abrasive tools in this range of particulate to bond ratio are generally very aggressive, and less metallurgical damage has been experienced in this range. High finishes on the work are obtained, and the wheels are found to require less frequent dressing following this processing means.

The thermosetting resin is heated to at least an optimum liquidity level and metered into the heated refractory particulate slowly or sequentially with good shear rate. After each addition of hot bond, which may be held at a higher or lower temperature than the mass of the refractory particulate, the mixture is stirred until uniform wetting of the particulate is achieved. The final mixture, when completely wetted by the resin, and in particular at the higher ratios, exhibits a modified granular flow since the mixture is somewhat tacky and the mold is kept at a temperature such as to provide easy movement of the mixture in the mold cavity.

Process D, unlike the above processes, is a two-stage method. The first stage of Process D is similar to Process C utilizing formulations wherein the weight ratio of particulate to resin is about 14:1 and higher to form molded articles which could be saleable products in themselves. However, in order to improve the properties and performance of the article, the second stage of Process D involves taking the molded article prepared in the first stage after the formulation has been set up, and the molded article is again heated to a temperature above about 95° C. and immersed in a mixture of additional thermosetting resin and catalyst which has been heated to the optimum liquidity (viscosity). This immersion stage results in the infusion of additional blood (cured binder) into the article and a reduction in void volume. At the completion of Process D, the ratio of particulate to bond is shifted back to from about 2.5:1 to about 4.5:1 as desired where the article is again heated to cure the thermosetting resin bond which has been infused into the article. Temperatures of from about 100°–210° C. can be utilized for this purpose.

The two stages of Process D assure a uniform geometric placement of spaced grains of abrasive in a bond, but where initial void volumes have been substantially reduced or entirely eliminated from predetermined, selected, component areas of the final abrasive wheel.

In the foregoing practices there are a number of variables which depend upon the dimensions (or proportions) of the molded article (abrasive, mold or filter element) which require further specialized consideration. Many of the detailed aspects of these variables are susceptible to known mathematical treatments and some details are to be acquired through experience.

One variable is heat energy input. This is inherently related to the nature of the thermosetting bond, the catalyst or hardener employed, knowledge of total weight of the article being produced (its mass) and geometry of the replicate.

Geometry of the replicate product is an important consideration relative to the temperatures employed in the manufacture of articles within the scope of this invention.

To illustrate the concept: The mass of a disc of 25 inches diameter, one inch thick would be 470 cubic inches, and the surface area is 1097 square inches. Ratio of area to volume 3:2.

A sphere of 470 cubic inches would have a radius of about five inches and an area of 326 square inches. The ratio of the area to volume would be of the order of 7:10.

Thus, the surface area of the disc of equivalent mass to the sphere would have about 3.36 times the area of that of the sphere.

As heat dissipation and heat loss are from the surface, one can see that a greater increase in temperature due to an exotherm is developed with larger mass to smaller surface areas with slower heat dissipation.

It follows, therefore, that when selecting temperatures for the mold, the refractory particulate and the resin bond, one must take into account the heat dissipation factors to be relied upon to avoid the exotherm from causing excessive temperatures internally of the mass to occur during polymerization. Once the article is set so as to enable removal from the mold, the final cure temperature does not face this critical temperature of the exotherm.

Another material factor involved in the heat transfer rates is the density of the mass. Density involves the nature of the particulate, the mesh or grit size and the ratio of particulate to bond. All become relevant factors. $Al_2O_3$ appears to be much more dense than does SiC particulates. 700 mesh particles would theoretically have a greater packing density than those of 12 mesh of the same particulate components. Thus, some consideration of these inherently variable factors is essential in selection of temperature ranges in massive shapes.

A generally useful guide is that when higher temperatures are selected, the surface area to volume of the article should be greater than 1 and the catalyst or hardener should be withheld until after dispersion of the refractory particulate in the resin is complete. Often it is advantageously practical to allow the heated dispersion mix of particulate and resin to cool, subsequent to said dispersion, before adding the catalyst. Mold temperature considerations can also bear adjustments depending upon the nature of the bond and the exotherm to be expected from the geometry of the piece.

Heat developed in the exotherm during molding may cause such temperature elevation, particularly in the center of massive sections, to deteriorate the bond strength as reflected in burning, shrinkage, scorching, etc., unless care is exercised. As such deterioration is most likely to occur centrally, sectioning will disclose discoloration if such exists and the temperature can be reduced to compensate in subsequent production.

Adequate regulated heating of the particulate, thermosetting resin bond and the mold is the essence of the invention. Heating of the particulate and the bond reduces the interfacial tensions between these items and focuses a large amount of energy into that interface for wetting and dispersion of the two dissimilar elements. Viscosity of the resin bond is reduced to an optimum condition. Heated abrasive or particulate drives off occluded gases, water vapor and volatile contaminants which inhibit wetting and dispersion and increase void formation during curing. Heating of the mold allows for continuing the wetting, continued displacement of occluded air, and continued maintenance of optimum flow of the particulate-bond mixture into the inner recesses of the mold cavity. Surface defects also are minimized. If the mold is below about 60° C., the viscosity of the mixture may increase too rapidly as it is cooled upon contact in the mold cavity.

Examples of the method of the invention utilizing Processes A-D as described above are summarized in the following Tables III, IV and V where potential material variations in three classification groups are set out. In the tables, Examples A-E each represent formulations forming articles at two different densities, namely: 2.1 $g/cm^3$ and 2.4 $g/cm^3$. Examples F-Q each represent formulations for articles at these two densities and additionally a third density, namely: 2.6 $g/cm^3$. Under each density and within each ratio of particulate to bond, one can determine actual weight in grams, the volume in cubic centimeters and the percentage volume of particulates, bond and voids. The void volume can be determined in cubic centimeters as well as in percent theoretically present in a given mass.

Examples A-E summarized in Table III illustrate the preparation of articles comprising low particulate-high bond, and it should be noted that in some instances, the bond is sufficiently high that no voids occur. The bulking value of the epoxy type thermosetting bond is 1.2 $g/cm^3$ and the abrasive particulate bond is about 1.8 to 2.10 $g/cm^3$.

Examples F-J summarized in Table IV utilize formulations also characterized as low particulate-high bond but in such formulations, the amount of particulate is greater than contained in the examples summarized in Table III. Accordingly, the examples summarized in Table III utilize Process A whereas the examples found in Table IV utilize Process B. Note, however, that Example F also can be followed utilizing Process A in view of the given weight ratio of 3.5:1.

In Table V, Examples K-Q illustrate formulations comprising high particulate-low bond, and depending upon said ratio, either Process B, C or D is utilized.

TABLE III

| Ex. No. | Wt. Ratio | Value | LOW PARTICULATE-HIGH BOND | | | | | | | | |
|---|---|---|---|---|---|---|---|---|---|---|---|
| | | | Part. 2.1 $g/cm^3$ | Bond | Voids | Part. 2.4 $g/cm^3$ | Bond | Voids | Part. 2.6 $g/cm^3$ | Bond | Voids |
| A | 1.6:1 | Act. Wt. (g) | 6361 | 3975 | 0 | | | | | | |
| | | Vol. ($cm^3$) | 1610 | 3312 | 0 | | | | | | |
| | | % Vol. | 32.7 | 67.3 | 0 | | | | | | |
| B | 1.8:1 | Act. Wt. (g) | 6645 | 3691 | | | | | | | |
| | | Vol. ($cm^3$) | 1682 | 3076 | 164 | | | | | | |
| | | % Vol. | 34.2 | 62.5 | 3.3 | | | | | | |
| C | 2:1 | Act. Wt. (g) | 6891 | 3445 | | | | | | | |
| | | Vol. ($cm^3$) | 1745 | 2871 | 306 | | | | | | |
| | | % Vol. | 35.5 | 58.3 | 6.2 | | | | | | |
| D | 2.5:1 | Act. Wt. (g) | 7383 | 2953 | | 8438 | 3375 | | | | |
| | | Vol. ($cm^3$) | 1869 | 2461 | 592 | 2136 | 2812 | | | | |
| | | % Vol. | 38 | 50 | 12 | 43 | 57 | | | | |
| E | 3:1 | Act. Wt. (g) | 7752 | 2584 | | 8860 | 2953 | | | | |
| | | Vol. ($cm^3$) | 1963 | 2153 | 806 | 2243 | 2461 | 218 | | | |
| | | % Vol. | 39.3 | 43.7 | 16.4 | 45.6 | 50 | 4.4 | | | |

TABLE IV

LOW PARTICULATE-HIGH BOND

| Ex. No. | Wt. Ratio | Value | Part. | Bond 2.1 g/cm³ | Voids | Part. | Bond 2.4 g/cm³ | Voids | Part. | Bond 2.6 g/cm³ | Voids |
|---|---|---|---|---|---|---|---|---|---|---|---|
| F | 3.5:1 | Act. Wt. (g) | 3039 | 2297 | | 9188 | 2625 | | 9954 | 2844 | |
| | | Vol. (cm³) | 2035 | 1914 | 973 | 2326 | 2187.5 | 408 | 2520 | 2370 | 32 |
| | | % Vol. | 41.3 | 38.9 | 19.8 | 47.3 | 44.4 | 8.3 | 51.2 | 48.2 | 0.6 |
| G | 4:1 | Act. Wt. (g) | 8268 | 2067 | | 9450 | 2363 | | 10240 | 2560 | |
| | | Vol. (cm³) | 2093 | 1723 | 1106 | 2392 | 1969 | 561 | 2592 | 2133 | 197 |
| | | % Vol. | 42.5 | 35 | 22.5 | 48.6 | 40 | 11.4 | 52.7 | 43.3 | 4 |
| H | 5:1 | Act. Wt. (g) | 8613 | 1723 | | 9844 | 1969 | | 10664 | 2133 | |
| | | Vol. (cm³) | 2180 | 1436 | 1306 | 2498 | 1641 | 783 | 2699.7 | 1777.5 | 444.8 |
| | | % Vol. | 44.3 | 29.2 | 26.5 | 50.8 | 33.3 | 15.9 | 54.3 | 36.1 | 9 |
| I | 6:1 | Act. Wt. (g) | 8862 | 1477 | | 10125 | 1688 | | 10971 | 1829 | |
| | | Vol. (cm³) | 2244 | 1231 | 1447 | 2563 | 1407 | 952 | 2777 | 1524 | 621 |
| | | % Vol. | 45.6 | 25 | 29.4 | 52.1 | 28.6 | 19.3 | 56.4 | 31 | 12.6 |
| J | 7.5:1 | Act. Wt. (g) | 9120 | 1216 | | 10423 | 1390 | | 11291 | 1506 | |
| | | Vol. (cm³) | 2309 | 1013 | 1600 | 2639 | 1158 | 1125 | 2858 | 1255 | 809 |
| | | % Vol. | 46.9 | 20.67 | 32.5 | 53.6 | 23.5 | 22.9 | 58.1 | 25.5 | 16.4 |

TABLE V

HIGH PARTICULATE-LOW BOND GRANULAR FLOW

| Ex. No. | Wt. Ratio | Value | Part. | Bond 2.1 g/cm³ | Voids | Part. | Bond 2.4 g/cm³ | Voids | Part. | Bond 2.6 g/cm³ | Voids |
|---|---|---|---|---|---|---|---|---|---|---|---|
| K | 8:1 | Act. Wt. (g) | 9188 | 1148 | | 10500 | 1313 | | 11376 | 1423 | |
| | | Vol. (cm³) | 2326 | 956.7 | 1639 | 2658 | 1094 | 1170 | 2880 | 1185.8 | 856 |
| | | % Vol. | 47.3 | 19.4 | 33.3 | 54.0 | 22.2 | 23.8 | 58.5 | 24.1 | 17.4 |
| L | 10:1 | Act. Wt. (g) | 9396 | 939 | | 10740 | 1074 | | 11634 | 1163 | |
| | | Vol. (cm³) | 2379 | 782.5 | 1760 | 2719 | 859 | 1308 | 2945 | 969 | 1008 |
| | | % Vol. | 48.3 | 15.9 | 35.8 | 55.2 | 18.2 | 26.6 | 59.8 | 19.7 | 20.5 |
| M | 12:1 | Act. Wt. (g) | 9541 | 795 | | 10904 | 909 | | 11813 | 984 | |
| | | Vol. (cm³) | 2415 | 662.5 | 1844 | 2761 | 757.5 | 1403 | 2991 | 820 | 1111 |
| | | % Vol. | 49.1 | 13.5 | 37.5 | 56.1 | 15.4 | 28.5 | 60.8 | 16.7 | 22.6 |
| N | 14:1 | Act. Wt. (g) | 9647 | 689.1 | | 11025 | 787.5 | | 11944 | 853 | |
| | | Vol. (cm³) | 2442 | 574 | 1906 | 2791 | 656 | 1475 | 3023 | 711 | 1188 |
| | | % Vol. | 49.6 | 11.7 | 38.7 | 56.7 | 13.3 | 30 | 61.4 | 14.4 | 24.1 |
| O | 16:1 | Act. Wt. (g) | 9728 | 608 | | 1118 | 695 | | 12044 | 753 | |
| | | Vol. (cm³) | 2463 | 507 | 1952 | 2815 | 579 | 1528 | 3049 | 627 | 1246 |
| | | % Vol. | 50.0 | 10.3 | 39.7 | 57.2 | 11.8 | 31.0 | 61.9 | 12.7 | 25.3 |
| P | 20:1 | Act. Wt. (g) | 9844 | 492 | | 11250 | 563 | | 12788 | 609 | |
| | | Vol. (cm³) | 2492 | 410 | 2020 | 2848 | 469 | 1605 | 3086 | 507 | 1328 |
| | | % Vol. | 50.6 | 8.3 | 41 | 57.9 | 9.5 | 32.6 | 62.7 | 10.3 | 27.0 |
| Q | 25:1 | Act. Wt. (g) | 9938 | 397 | | 11359 | 454 | | 12305 | 492 | |
| | | Vol. (cm³) | 2516 | 331 | 2075 | 2876 | 378 | 1668 | 3115 | 410 | 1397 |
| | | % Vol. | 51.1 | 6.7 | 42.2 | 58.4 | 7.7 | 33.9 | 63.3 | 8.3 | 28.4 |

Ranges of particle sizes of standard available abrasive particles (largest numbers being smallest size) range from 1300 to 700 (very special, particle size measured by floating) and 240 to 24 with the following specific numbers 240, 220, 180, 150, 120, 100, 90, 80, 60, 54, 36, 30, 24 (and coarser grades). It is worthy of note that as the size of the particle in the abrasive refractory particulate increases the surface area decreases in proportion to volume. In the small mesh or grit sizes the surface to volume ratios become quite large. Comparative weight and volume ratios shown in Table VI

TABLE VI

| Weight Ratio Particulate/Bond | % of Bond Volume to Particulate |
|---|---|
| 6:1 | 47% |
| 8:1 | 40% |
| 15:1 | 22% |
| 26:1 | 13% |

Total Volume = Particulate Volume + Bond Volume + Interstitial space volume.

Information relative to the molded articles of this invention is determined in the following manner. A piece of the article is broken off and its weight and volume are determined. The piece is burned to remove the bond (resin and catalyst) leaving only abrasive and the actual weight and volume is determined. The volume of particulate alone is subtracted from original volume. The volume bond plus volume abrasive is found and subtracted from original volume to determine the interstitial volume.

Illustrative Data,

| | |
|---|---|
| Original volume (Displacement) | = Z |
| Weight of burned piece | = Y |
| Weight of original piece | = X |
| Weight of bond | = (X − Y) |
| $\dfrac{Y}{\text{S.G. of Abrasive}}$ | = Volume of Abrasive (A) |
| $\dfrac{(X - Y)}{\text{S.G. of Bond}}$ | = Volume of Bond (B) |
| Z − (A = B) | = Interstitial Space (C) |

EXAMPLE R (Generally illustrative of Process A)

This example details the manufacture of a grinding wheel for finishing end bearings. It is representative of a molded article having a relatively high mass to surface area, or close to spherical proportion. It has no arbor hole and the dimensions are as follows: 6 inches outside diameter by 4.187 average height (slightly dished) and a volume of 1940 cm³. Particulate (abrasive grit W-280 Al₂O₃)=3116 grams. Epoxy bond (liquid)=1385 grams. Abrasive:Bond ratio=9:4 by weight.

Particulate and bond are each separately heated to about 190° C. The hot particulate is slowly metered into the full volume of hot bond with good shear rate. Temperature loss after mixing cooled mass to about 120° C. The 340 g. of catalyst-hardener (Tonox) is incorporated at the latter temperature. The circular mold (without arbor hole) is heated to 60° C. The temperature of the mold is kept low to accommodate for the geometry of the replicate which has high mass or volume to small surface area which allows little heat loss due to radiation. The mass at about 120° C. is transferred into the mold at 60° C. The exotherm is sufficient to set the replicate in a solid form (which is then removed from the mold) after two hours. Curing of the set mass is completed in an auxiliary oven at about 135°-140° C. for two hours and at 175° C. for an additional two hours to complete the cross-linking of the bond. Note that the temperature of bond and mold is held low to accommodate for added heat of the exotherm and the high volume or mass:low surface area being of a relatively low heat loss geometric relationship.

Having laid a foundation for the language and terms used herein in illustration, it may be of interest to go through a calculation to record factors of concern in the practice of the invention and in reproduction of actual examples in the practice of the invention.

An abrasive grinding disc is contemplated and contains 1000 cm³ by volume. Total losses calculated are 10%. The final density of the disc is established to be 2.4 g/cm³. Past experience indicates the ratio of particulate to bond ratio most useful for the end purpose is 3:1.

|   | Vol. | Den. | Loss |
|---|---|---|---|
| (a) Total weight required = | (1000) × | (2.4) × | (1.10) |
| | = 2640 g. total weight of completed article (calculated.) | | |

(b) The weight ratio is 3:1 or 1:4 is the bond weight and 3:4 is refractory particulate.
(c) 2640/4=660 g. Bond weight
(d) 660×3=1980 g. particulate weight.
(e) Heat 660 g. resin (catalyst withheld) to about 100° C.
(f) Heat 1980 g. particulate (80 mesh) to 120° C.
(g) While stirring the heated resin, the heated particulate is slowly metered into and incorporated into the resin by effective shear
(h) The dispersion having been completed, the mold is also heated to about 120° C.
(i) Catalyst or hardener is incorporated in the hot particulate-resin admixture and the mold is filled, and, if required, closed off with the requisite mold top cover piece.
(j) The mass in the hot mold is found to be set in 2-3 hours at 170° C. The mass is hard enough to be removed from the mold. The set replicate is then transferred to an oven at about 150° C. for 4-5 hours to assure full cross-linking and self-supporting solidication to ultimate strength of the replicate.

EXAMPLE S

This example illustrates manufacture of a very aggressive roll grinder used with high H.P. input. High rate of stock removal per pass machinery.

Size of wheel: 36"×3"×14"
Volume of wheel=42,472 cm³
Total weight=235 lbs.
Abrasive particulate=54 grit Al₂O₃
Total bond weight=47 lbs., 3 oz. (21,400 g.)
Total abrasive weight=188 lbs. 11.3 oz. (85,600 g.)
Abrasive:Bond ratio (by weight)=4:1

Following Process B, both abrasive particulate and organic bond (including catalyst 100/28) are separately heated to about 105° C. and the total heated refractory particulate abrasive particles mixed with good shear into the heated bond.

In the original development of this invention separate heating of the refractory particulate separate and apart from the polymeric bond was used. Outstanding results are obtained by this practice. It is not absolutely essential to separately heat, however, in all ratios of particulate to bond. However, in some of the ratios of particulate to bond separate heating is essential as these components are combined in different orders. In this example the hot abrasive is metered with stirring into the heated bond. The resultant mixture is discharged into a mold preheated to about 105° and the mixture in the open mold is maintained at this temperature for about two hours. The solidified wheel is removed from the mold and baked in an oven at 175° C. for about three hours to complete the cure.

The performance characteristics of the large grinding wheel obtained in this manner were obtained and compared to two commercially available wheels of the same size. Wheel I was an example of a prior art polyurethane wheel while Wheel II was a prior art epoxy wheel. The results are summarized in the following Table VII.

TABLE VII

| OPERATIONAL DETAIL | COMMERCIAL WHEEL I | COMMERCIAL WHEEL II | INVENTION WHEEL WHEEL III |
|---|---|---|---|
| Total stock removed per wheel-Average | 18,000 cu.in. | 14,250 cu.in. | 28,800 cu.in. |
| Actual depth of cut per pass obtained | .002" | .0017" | *.003" |
| Grinding Ratio Stock removed (vol) / Wheel loss | 4.5/1 – 5/1 | 3.75/1 – 4/1 | 6.5/1 – 8/1 |
| Average stock removal by comparison ratio | 4.75:1 | 3.9:1 | 7.2:1 |
| No. of passes before manual adjustment required | 2 | 1.5 | 3–4 |
| Operating Characteristics | Fairly quiet Some chatter | Noise Much chatter | Quiet No chatter |

*(33% more stock/pass)

EXAMPLE T (Illustrates Process B)

The abrasive wheel of this example illustrates manufacture of a heavy duty wheel where pressures applied between wheel and work piece are mid-range. The abrasive to bond range is close to 5:1.

The specific dimensions of the abrasive disc are close to 39"×20"×3", there being a central recess in one side of about 23"×1½". Total weight of the replicate mass is 90 pounds. Bond weight (epoxy polymer-Reichhold 37-140) is 15 pounds 10.4 ounces. Particulate is 54R grit and weight 74 pounds 5.6 ounces. Hardener "Tonox".

The abrasive is heated to about 150° C., and the bond to about 120° C. The hot abrasive is metered into the hot bond. (Operable, but less preferred practice would permit at this ratio of particulate to bond metering both materials together and heating the two with good agitation (shear) to about 150° C. with a high shear rate or efficient mixing). The heated abrasive is free from occluded gases and the surface, being somewhat hotter than the bond, tends to promote reduced interfacial tension, excellent wetting and dispersion of the particulate into a substantially monodispersed particle effectively wetted by the bond which exhibits an optimum liquidity. It is preferred, but not an absolute requirement.

The mold is heated to about 120° C. The dispersed particulate-bond now about 135° C. is poured into the mold after the "Tonox" catalyst (Uniroyal) has been added. Set occurs in about two hours, permitting removal of the mass from the mold. The set mass is further heated in an oven at 120° C. for 2-3 hours, then at 175° C. for 2-3 hours to assure full cross-linking of the epoxy bond.

It is to be noted in this wheel geometry there is a relatively large surface area to mass (disc), so that heat is lost from the mold and the mass by surface radiation at a positive rate. In wheels of this large surface ara to volume ratio, little trouble has been noted with central overheating within the structures by the exotherms. Temperature of heating of the mold is less critical.

EXAMPLE U

A grinding wheel 8"×1"×3" is prepared as follows. 1600 grams of 240 R mesh abrasive ($Al_2O_3$, General Abrasives Co.) particulate heated to 120° C. are mixed into 3578 grams of Epoxy 37-140 available from Reichhold (withholding catalyst preferably until mixing is completed and before transferring the hot mix into the heated mold). Hardener ("Tonox") is then added.

The completely wetted and dispered particulate-bond admixture is transferred to a mold, preferably heated above 90° C. and not above about 120° C. and into the oven at about 120° C. for about two hours. The set replicate of the mold is removed and further oven cured at 175° C. for an additional two hours. The volume of the wheel is 708 cm³ and the wheel possesses a relatively high ratio of surface area to volume. Build-up of heat due to exotherm is not excessive. The temperature of the wheel is not massive enough to cause charring or excessive shrinkage of the wheel while in the mold at these temperature limits.

EXAMPLE V (Illustrating Process D)

Machining sticks having the dimensions of ½"×½"×8", having a high degree of aggressive quality for a given mesh size of abrasive, maximum cutting points and high impact strength with stress absorption in the grain anchorage optimum are prepared in this example. The abrasive grit is 54 mesh $Al_2O_3$. The epoxy polymer bond is Reichhold 37-140 and the hardener is "Tonox" (Uniroyal).

In the first step, twenty parts by weight of the abrasive grit is heated to 175° C. and a quantity of epoxy bond is heated to about 150° C. One part of hot bond is metered into 20 parts of hot abrasive particulates. After intimate mixing the bond coated abrasive particles resembles sugar flow at room temperature. The mold is heated to about 120° C., and the hot coated abrasive gently tamped into the mold, the mobile mix filling the interior of the mold cavity. The mold is held at 120° C. for 1-2 hours, whereupon cross-linking sufficiently occurs to produce an integral shape which is removed from the mold. The weight is about 73 grams, and the weight ratio of abrasive particulate to bond=20:1 at this point.

The set shape is removed from the mold. The pores of the set replicate are completely saturated by spraying or dipping the heated replicate form with sufficient hot catalyzed epoxy polymer at a temperature of optimum liquidity (above 60° C. and not essentially above about 120° C.) to fill the voids developed in the first step (b). The appearance of the surface of the wheel when viewed at an angle will indicate when the pores are filled, but a total weight of about 88 grams of the replicate, or a total bond of about 18.5 grams, a gain of about 15 grams, is sought. The initial ratio of about 20:1 has been reduced by the second step to about 3.7:1. A second bake of 1-2 hours at 110° F. completely cures the bond.

EXAMPLE W

Honing sticks of the same sizes as made in Example V, are produced in the same mold but under different processing conditions. To obtain a high degree of flexibility in a honing stick a urethane quality of thermosetting polymer is selected from Ren Plastics. The polyurethane is in two parts, one is identified as RP 6402 and is herein called T-resin. The abrasive particulate is a regular fused grade of $Al_2O_3$ (300 grit). The second polyurethane component is identified as R-resin.

$Al_2O_3$ (675 g.) grit heated to 50° C. is metered into 100 g. of T-resin at 50° C. and intermixed. The particulate is vigorously dispersed therein. After thorough wetting and dispersion, the R-resin component (35 grams) (warmed to 40° C.) is quickly stirred into the T-wetted abrasive mixture at about 50° C. and poured into a series of heated molds at about 50° C., and the molds covered. After overnight aging at ambient temperature, the cured flexible honing sticks are removed from the mold. Greater flexibility, desirable in honing tools, is obtained. As the urethane material is more heat sensitive, temperatures have to be lower than with catalyzed epoxy resins, to obtain safe working life without premature polymerization of the bond. Note the components of the cross-linked polymer are kept apart until particulate-bond dispersion had been completed.

EXAMPLE X

A series of tests attempting to produce the critical resiliency and hardness in an abrasive disc for use in sharpening edges of cutting tools results in this example. This example further illustrates use of a polyurethane quality bond in the practice of this invention. Manufactured is a 9" O.D. disc of varying depth of section having a refractory particulate to bond ratio when completed of about 3:1 by weight.

A combination of Processes A and D appears to be most practical to overcome the greater reactivity of the urethane used.

(a) 290 grams of abrasive particulate are weighed out comprising a 70% hydrous aluminum silicate (Serex) having a S.G. of 2.7 grams/in. and an average particle size of 3.66 microns. The abrasive is heated to about 65° C.

(b) 77 grams of "R" (resin polymer RPG402 compound of Ren Plastics are heated to about 38° C.

The hot abrasive is metered into the heated resin bond at a rate such that the temperature of the mixture does not exceed about 50° C. until the abrasive is fully wetted by the liquid resin. The temperature of the batch is preferably cooled to not more than about 38° C., and 220 grams of hardener at about 25° C. are compounded therewith. The batch temperature should not exceed about 25°–30° C.

The resulting mixture when fully uniform is immediately poured into a mold heated to about 33° C. As the viscosity of the pourable mixture increases rapidly with time, the more rapidly the latter step can be carried out, and the better the quality of replicate abrasive disc product. The mold is closed as soon as the pouring or transfer is completed.

Cross-linking of the urethane polymer continues to harden the mass and the replicate disc develops a sought for, critical D-scale Shore hardness of between 70 and 100. This range is critical to produce a desired flexibility in the replicate tool sharpening wheel or disc.

In use of the Shore D hardness instrument, a first reading will be between 70 and 100. A second reading, delayed for 5 to 10 seconds, will read about 15 units less, or about 55 to 75. This factor, or fall has been recognized as a measure of "creep". Creep in sharpening and honing tools, as in this example, is critical to the advance in the art of this novel wheel or abrasive tool for very fine tool sharpening ends. (Surgeons tools, needles; craftmans chisels, etc.)

EXAMPLE Y

In this example, a centerless regulating wheel is prepared which is classified as very hard. It has a weight ratio of 80 mesh $Al_2O_3$ regular particulate to epoxy resin (Reichhold 37–140) of 6:1, and is made by Process B. The abrasive wheel is 12"×6"×5" and has two central recesses of 7½"×1½". 46 pounds 13 ounces of abrasive particulate and 6 pounds 2 ounces epoxy resin and one pound one ounce Tonox (Uniroyal) hardener are required in manufacture. The abrasive and bond are intermixed at 95° C. When thoroughly dispersed, the mold is heated to 120° C. and after adding one pound, one ounce of Tonox hardener to the dispersion, the abrasive-bond-hardener at about 95° C. is transferred to the heated mold. After two hours the replicate wheel is removed from the mold and further heat-treated for 3 hours at 120° C. A very hard product is obtained.

EXAMPLE Z

A centerless regulating wheel is prepared as follows. 42,185 g. of 80 mesh $Al_2O_3$ is heated to 95° C. A blend of epoxy resins, the first (a) more aromatic, the second (b) more linear are weighed out and blended together. The first (a) is Reichhold 37–140, the second (b) Dow F-736. 5750 g. of (a) resin, 860 g. of (b) resin and 1830 g. hardener "Tonox" are blended and heated to 90° C. and mixed. The hot abrasive is then introduced into the catalyzed epoxy resin blend until thoroughly wetted and dispersed. The weight ratio of abrasive particulate to bond is 5:1. The mold is of high bulk value, being 14 inches O.D. and 8" high. To avoid the problem of overheating with the bond exotherm, the mold is preheated to 65° C., and the hot mix at about 83° C. is transferred into the mold at 72° C. A first bake in the mold at 120° C. for 3 hours is followed with a second 2-hour bake at 175° C. No shrinkage or charring in the mold occurs. This abrasive article exhibits a more flexible nature than those wheels made with the more reactive, less linear epoxy resin above.

EXAMPLE AA

This example illustrates a modified procedure of the invention using delayed addition of the catalyst-hardener for the preparation of a grinding wheel having an outer diameter of 30", an inner diameter of 10" and a thickness of 3". Epoxy resin available from Reichhold under the trade designation EPOTUF #37-140 (2,562.5 grams) and 50,000 grams of pure white 400 mesh aluminum oxide are each preheated to 95°–110° C., and the abrasive is added slowly to the liquid resin with thorough mechanical mixing until all abrasive agglomerations are dissipated, and the mix is smooth. The temperature of the mix is then reduced to about 70°–80° C., and the hardener, which has been preheated to about 95° C. is incorporated and mixed in until the mix again is uniform and smooth. The resulting fluid mixture is promptly poured into a mold preheated to about 90°–95° C. where it remains for two or three hours until the mixture has solidified sufficiently for safe handling. The abrasive wheel now is removed from the mold and heated in an oven for about three hours at approximately 107° C. A further baking of the wheel for three to four hours is then conducted at a temperature of about 175° C., either immediately or, if more convenient, after the wheel has been cooled and stored. In this example, the ratio of abrasive to bond is 1.9:1 by weight, and the finished wheel weighs about 168 pounds.

EXAMPLE AB

This example illustrates a somewhat modified procedure of the delayed addition of catalyst illustrated in Example AA. This modified procedure is preferred when producing a thin grinding wheel having an abrasive to bond ratio of from about 1.9:1 to 2.6:1 by weight. In this example, a circular mold having an outer diameter of 8", an inner diameter of 1.25" and a depth of 1" is employed to produce a wheel which is about 0.220" thick.

The resin and abrasive are preheated to a temperature of about 120° C. and thereafter mixed thoroughly together and allowed to stand for an extended period such as, for example, one hour. Over this time period, the liquified resin continues to wet the grains with increasing effectiveness. Hardener, also preheated to about 120° C., is incorporated in the mixture and stirred for about one minute to produce a very smooth pourable mix which is quickly poured into the mold preheated to a temperature of about 175° C.

A hot air gun is played upon the exposed surface of the mix contained in the mold at a temperature of about 150°–205° C. to reduce slightly the viscosity of the mix at such surface temperature and to assist in the formation of a thin superficial layer of binder resulting from employment of a slight excess of binder constituents. A block of foam plastic insulation can then be placed upon such mold out of contact with the mix, and the mix cured for about one hour at about 120° C. The solidified but only partially cured wheel is removed from the mold and cured in a oven, firsr for two hours at 120° C., and then for three hours at about 175° C. Finally, the superficial layer of excess binder is machined off.

As indicated, the procedure of this example is effective particularly in the production of a highly uniform wheel which may be very thin relative to its diameter, such thickness ranging from about 0.10" to 3" depending on the wheel size. The mix may be tamped in the mold and/or the mold can be vibrated to assist in achieving an abrasive grain concentration at least equal to the pack density and preferably more.

EXAMPLE AC

An 8"×1" wheel with 1.25" arbor hole is prepared by separately preheating 1800 g. of $Al_2O_3$ grit and 264 g. of epoxy polymer 37–140 to a temperature of 95°–120° C. The hardener (100 g. of Tonox) is heated to 110°–120° C. and mixed with the preheated epoxy polymer. Polyurethane (88 g. of VIBRATHANE B-602) heated to 60° C. is added to the mixture with stirring followed by addition of the preheated $Al_2O_3$. This mixture is placed in the mold which is preheated to about 120° C. and baked at this temperature for about two hours.

The wheel prepared in this Example (weight ratio of epoxy to urethane of 3:1) is a fast acting grinding wheel which nevertheless has an appreciably greater impact strength which quality is introduced by the percentage of urethane added. Similar wheels can be prepared with weight ratios of epoxy to urethane of from 1:1 to about 10:1.

EXAMPLE AD

Most commercial processes for preparing resinoid phenolic grinding wheels use a powdered form of phenolic resin. This example illustrates the preparation of a resinoid type wheel using a phenolic resin in liquid form which enables abrasive concentration of higher order while yet assuring that each abrasive grain is coated and so separated from other adjacent grains so as to maintain the desired micro separation needed to avoid stress concentration.

Liquid phenol formaldehyde resin identified as No. CR3298 available from Clark Chemical Corp., Blue Island, Ill. is heated to about 65° C. and mixed with water heated to the same temperature to provide a mix containing about 50% of water. Abrasive preheated to 95° C. is added with stirring to the resin-water mixture. This mixture is discharged into an open mold of the desired shape and heated to about 140° C. for about three hours to cure and set the mixture to the desired shape.

One feature of the process of the invention is that the process enables the preparation of grinding tools generally containing materially increased abrasive content while maintaining bond volume virtually the same. Since the abrasive content has been increased, more work at a faster rate is obtained. Also, because the abrasive grains are not pressed together, high dynamic strength is achieved by a non-brittle bond.

The process of the invention using controlled heated ingredients and mold results in products wherein the binder film surrounding the particulates and forming the article is characterized as being free of significant discontinuities such as voids which otherwise weaken such films. The articles produced by the method of the invention can contain varying amounts of voids between the grains which is desirable for performance.

As mentioned above, the method of the invention is useful for preparing molded products which can themselves be used as molds. Rigid molds prepared in accordance with the method of the invention as described more fully below can be prepared by the method of the invention which are useful in the production of grinding wheels. Other examples of molds which can be prepared by the method of the invention include foundry molds, elastomeric molds, multi-part molds comprising one rigid part and one flexible part, etc.

In the preparation of molds in accordance with the present invention, a variety of discrete particles such as sand, sericite, mica and sawdust are bonded together employing the preheated resin bond described earlier in this application. The resulting molds may comprise a high proportion of the discrete particles such as sand and a small amount of binder such as the epoxy in the case of foundry molds, or a relatively larger amount of binder to provide a smooth non-porous mold surface. In some instances, the molds prepared in accordance with the method of the invention may replace conventional steel molds at a very considerable saving in cost.

Typically, the granular or particulate material such as sand and the thermosetting resin binder are each individually preheated and thereafter mixed to form a moldable composition which can be shaped by means of a suitable pattern to produce the desired mold. The details of the procedure to be followed in preparing the mold are those which are described previously in this application. The amount of resin binder employed may vary widely depending upon the desired characteristics of the mold to be produced. Molds for abrasive articles such as grinding wheels, for example, normally will have a higher binder content to afford a smooth surface for the mold cavity and provide sufficient durability to permit a substantial period of re-use. In general, the new mold compositions of this invention permit operations at quite high temperatures and produce mold surfaces of desired smoothness, not only to afford smooth surfaces on the products but also to enable easy release from the mold cavities.

The patterns and containers employed in forming such molds will also desirably be preheated to a temperature above 70° and more preferably above 100° C. to avoid localized chilling of the resin-particulate mix and interfering with a proper cure. Indeed, such patterns and containers, especially if of metal, may have a beneficial heat sink effect. Because the highly heated, highly liquid, resin binder wets the preheated particulate material so effectively, very small amounts may be utilized, if desired, as in the case of foundry sand molds. Such binder may be cured to an essentially rigid but non-brittle condition to provide a relatively strong, less fragile, sand mold more easily handled without damage than in the case of prior art foundry molds.

The elastomeric slightly flexible molds for producing small abrasive articles, for example, are preferably produced using a linear epoxy resin in substitution for all or part of the aromatic epoxy resins generally utilized in production of the rigid molds.

Rigid Molds

Referring now to the drawing, and more particularly to FIGS. 5–7 thereof, the production of a rigid mold for grinding wheels is there illustrated. A circular steel plate 1 is closely encircled with a sheet metal rim 2, and my new mixture 3 of preheated sand and epoxy binder is placed therein encircling a central steel cylinder 4. Then an annular pattern 5, which may be either of wood or aluminum, for example, in the shape of a grinding wheel is fitted around such cylinder and pressed into the mix as shown in FIG. 6. All ingredients and components may desirably be at 120° C. and may be maintained at such temperature until the resin bond has cured sufficiently to rigidify the mix and render it self-supporting. At this point, plate 1, rim 2, and pattern 5 may be removed and the mold cured for 2 or 3 hours at 175° C.

Thereafter, such mold may be employed in the production of grinding wheels by placing a mixture 6 of preheated abrasive grit and epoxy binder in the mold cavity formed by such pattern 5, as shown in FIG. 7. Again, the mold and all ingredients may desirably be at 120° C. and when the molded grinding wheel 6 has sufficiently set it may be removed from the mold and the cure completed at 175° C. while the mold is re-used. Because central steel cylinder 4 which defines the internal diameter of such wheel extends through mold 3, it may be punched out while the wheel is still in the mold cavity, facilitating subsequent removal of the wheel from the mold.

A typical mold produced as above described may comprise 6000 grams of sand ($SiO_2$) and 1000 grams of the resin binder, both preheated to 120° C. A preferred formulation of such thermosetting binder may comprise 100 parts of epoxy resin to 28 parts of curative or hardener, by weight. While the mold body may contain a small proportion of voids, these are individually small and the mold surface is smooth and substantially impermeable. Use of 20% by weight, or more, of the binder composition is generally sufficient to render the mold cavity impermeable even to very fluid resin-abrasive mixes.

Such molds are strong and generally reusable a large number of times. If desired on occasion, the mold cavities may be further sealed with a very thin coating of the heated binder or a mixture of preheated binder and preheated mica. Well known commercial parting compounds of either the silicone or wax type may be employed on the patterns and also to coat the mold cavities when such molds are put in use.

Foundry Molds

Referring now to FIGS. 8 and 9 of the drawing, a typical foundry drag flask 27 is shown containing a sand mold 8 with a portion 9 of the mold cavity formed therein. The usual foundry mold sand may be employed, mixed with from 5% to 20% by weight of thermosetting epoxy resin binder. Again, all ingredients and components, including the pattern (not shown), may desirably be preheated to 120° C., and the mold cured initially at such temperature and finally at 175° C. A uniform mixture of such sand and binder, when the percent of binder is as low as indicated, is best obtained by adding the hot liquid resin binder to the supply of abrasive grit in a series of small batches, with thorough stirring. The pattern will be coated with the usual parting compound, either silicone or wax, and will be drawn as soon as the mold has set to a sufficient degree. A cope mold 10 may be similarly produced and mated with the drag 8 as shown in FIG. 9, with an appropriate core 11 within the mold cavity. The mold may then be sprued and provided with risers if needed, in conventional manner. In fact, the entire operation may be carried out generally consistently with established foundry practice, except for the preparation of the molding sand and the curing of the mold parts. Cores may be blown utilizing the same mix and cured in the same manner.

Foundry molds thus formed are very strong and may be produced in otherwise difficult shapes. Indeed, they are remarkably strong and rigid even when minimum amounts of binder are employed, and this permits the foundryman to achieve a wide range of porosity. In one modification, the mold may be made with a small amount of binder (e.g., 5%, by weight, of the weight of sand employed), with consequent high porosity, and the pore openings at the mold cavity may be at least partially sealed by application of a thin coating of mica or sericite in a supply of the highly heated liquid binder. Such coating may comprise 1 part mica, 1 part epoxy resin, and 0.28 part of the curative, and may be applied after the pattern is drawn but prior to the final cure.

Foundry molds produced in accordance with the invention may be modified and repaired, and cores produced of the same composition may be emplaced and bonded in position, utilizing the same resin binder and the same or different particulate material as an adhesive or bonding agent. Cores blown on core-blowing machines utilizing the new mixture are unusually strong and easy to handle and set. Because of the small amount of binder employed, and the high temperature of operation, the uncured mixture is remarkably non-sticky and easy to handle. This is in marked contrast to mixtures of sand and epoxy resins at room temperature or slightly elevated temperatures.

Elastomeric Molds

As shown in FIGS. 10-12, I may provide an open multi-cavity mold of elastomeric material for mass production of small mounted abrasive wheels and the like. In the form illustrated, the mold block 12 is provided with 10 cylindrical mold cavities such as 13 and having coaxial smaller cylindrical openings such as 14 extending from the bottoms of such cavities through the block. Such mold block may be placed upon a platen 15 with mandrels such as 16 inserted in openings 14 and extending into the respective mold cavities. Abrasive grit such as 54 mesh aluminum oxide is mixed with a relatively small amount of thermosetting epoxy resin binder by pouring the latter into the supply of grit in small sequential batches, all ingredients and components being preheated to 120° C. The resultant mixture 17 (see FIG. 12) is packed into the mold cavities and embeds and bonds to the protruding end portions of mandrels 16. In the case of abrasive wheels 2 inches in diameter, after about an hour at 120° C. the mold block 12 may be slightly flexed and the rigidified abrasive wheels easily unmolded. The latter may then be further cured for about 2-3 hours at 120°-175° C.

Such mold block 12 is produced in a novel manner to be sufficiently rigid to form molded articles to precise dimensions but also sufficiently flexible (at least when heated) to facilitate ejection of such articles from the mold cavities. Furthermore, bubbles and voids are largely eliminated to assure smooth surfaces of the mold cavities and thereby avoid problems in unmolding.

Another flexible elastomeric mold designed to produce an abrasive wheel having a central arbor hole rather than being bonded to a mandrel is illustrated in FIGS. 13 and 14. Here, the circular mold block 18 is provided with an annular recess 19 having a beveled outer periphery 20 to form a drill pointing wheel. The central circular table portion 21 defines the internal diameter of the wheel similarly to steel cylinder 4 of FIGS. 5–7. Inasmuch as the wheel to be molded is relatively thin and the mold itself may be slightly flexed, it is possible to release and unmold the wheel without driving out such central portion. Indeed, a rigid one piece mold of this configuration is also feasible.

Mold block 12 and mold block 18 are both formed of a mixture of thermosetting epoxy resin binder and particulate material such as sericite. Such resin may preferably be a linear epoxy resin or a mixture with aromatic epoxy resin.

Multi-Part Molds, One Part Rigid and One Part Flexible

An abrasive cup wheel such as 22 (FIGS. 15 and 16) having an annular working face 23 may be produced in accordance with the invention using a two-part mold, one such part being rigid and the other being flexible. As used in this specification, flexible means that the piece exhibits some measure of flexibility at some temperatures including elevated temperatures. The flexible molds of the type made herein may be quite rigid at room temperatures yet exhibit a slight degree of flexibility at higher temperatures thereby permitting facile removal of the cured molded article from the hot flexible mold by twisting or bending of the mold. In one example, the flexible mold is found to have a Shore D hardness of 55–60 at room temperature and of 25–30 at 95° C. In this example, such cup wheel is provided with a coaxial arbor hole 24 extending from the back of the wheel to the bottom of the cup shaped recess 25. It will be appreciated that FIGS. 15 and 16 equally illustrate both the abrasive product and the pattern utilized to form the mold.

Now referring more particularly to FIGS. 17–20 of the drawing, a method of forming such mold is illustrated. A pattern or indexing plate 26 is provided having a plurality of openings such as 27 therethrough of a diameter very slightly greater than that of arbor hole 24. A sheet metal side member 28 encircles the plate area to confine the compositions to be employed to form such mold.

The cup wheel patterns such as 29 (corresponding to cup wheel 22) are inverted and indexed upon plate 26 by means of pilot pins 30 fitting somewhat loosely in holes 27. The assemblage, including such pins, may be supported on a base board 31 (FIG. 18). Then a mixture of thermosetting epoxy resin binder 32, of a type adapted to produce a somewhat flexible elastomeric body when cured, and particulate material such as sericite is poured around such patterns to a level even with the back surfaces 33 thereof. This mixture is then cured, ordinarily at 120° C., to a point where it is firm and self-supporting.

As shown in FIG. 19, the assembly of pattern 29 and the partially cured mold body 32 is next inverted on plate 26 so that the pin 30 projects through hole 27 with the back 33 of such pattern resting on such plate. A mixture of thermosetting epoxy binder resin 34, of a type adapted to produce a rigid body when cured, and particulate material such as sericite is thereupon poured over such assembly and both resin bodies cured to their final condition.

At this point, the two mold bodies 32 and 34 may be separated and the patterns 29 removed. Consequently, when such two mold bodies are subsequently reassembled as shown in FIG. 20 (after being re-inverted) the corresponding mold cavities such as 35 are ready to receive the abrasive-binder mix to form such abrasive cup wheels. The pilot pins 30 remain embedded in rigid mold body 34 and serve to define the arbor holes 24 in the abrasive wheels 22 cast in such cavities. Sheet metal sides ensure proper registration of the two mold blocks, although locating pins (not shown) may also be provided, if desired. After partially curing the wheels to firm self-supporting condition, the mold blocks may be separated with the wheels being readily released and unmolded due to the draft of the mold cavity and the flexibility of mold block 32. Curing of the wheels is then completed while the molds are ready for re-use.

It will be seen that pins 30 thus serve both to index the pattern and mold parts (FIG. 19) and also later to define the arbor holes in the molded wheels 22. Perforated plate 26 may be replaced over such pins after filling cavities 35, if desired, to assist in squeezing the abrasive mix in such cavities.

Further examples of multi-part molds in which one part is rigid and another part is flexible are illustrated in FIGS. 21–25 inclusive.

A lower mold block 36 may be provided of flexible elastomeric material containing a plurality of circular mold cavities such as 37, 38 and 39. Each cavity has a coaxial, cylindrical opening such as 40, 41 and 42 extending from its bottom through the block. Registration pins such as 43 are adapted to engage in an upper rigid mold block 44 to register the latter.

Upon block 44 is provided with downwardly protruding circular bosses such as 45, 46 and 47 adapted to fit within the corresponding cavities in block 36 conjointly to define cup shaped mold cavities for the formation of mounted abrasive cup wheels. As shown in FIGS. 22 and 23, mandrels such as 48 may be inserted in the openings such as 40 and 41 with their upper ends protruding into the corresponding cavities, and such cavities may be nearly filled with an abrasive-resin mix 49. The two mold blocks may then be brought into mating engagement between upper and lower squeeze boards 50 and 51 to compact such mix and form the molded articles. The mandrels are bonded to the mix.

After a preliminary cure to set such articles to firm self-supporting condition, the mold blocks may be separated and the lower elastomeric block 36 slightly flexed to aid in unmolding of the articles. Such articles may thereafter be cured to their final condition.

The embodiment of the invention illustrated in FIG. 24 comprises a mold for a mounted point rather similar to that of FIGS. 21 and 22 except that both mold blocks are provided with mating cavities. Thus, upper mold block 52 may be mated with lower mold block 53 by means of registration pins such as 54 so that upper cavity 55 matches lower cavity 56. A steel mandrel 57 may be inserted through coaxial opening 58 extending from the bottom of circular cavity 56 through mold block 53, with the upper portion of such mandrel protruding into such cavity. In this instance, it is usually advantageous to mound the abrasive-resin mix in cavity 56 and then, after closing the mold, to force mandrel 57 up into position, thereby ensuring that the mix is pressed tightly against the walls of the mold cavity.

FIG. 25 shows a generally similar section through a portion of a mold assembly for mounted points of a shape requiring removal of the latter from the mold cavity in the direction of the shank or mandrel. The lower flexible elastomeric mold block 59 is formed with pointed, rounded, or tapered cavities such as 60 and is mated to a perforated rigid upper plate 61. Such mold block and plate are registered as by means of pins such as 62 so that the holes or perforations such as 63 are centered with the corresponding cavities. Before closing the mold, the cavities are filled with the abrasive-resin binder mix 64.

If such mix is dense and not readily flowable, the steel pin or mandrel 65 may be inserted through hole 63 and forced into the body of abrasive-resin binder mixture 64 by means of platen 66, thereby spreading and compacting such mixture to conform perfectly to the mold cavity. If, on the other hand, the mix is readily flowable and even soupy in character, so that such mandrel may sink therein to an indeterminate extent, platen 66 may constitute a magnetic chuck and such platen and upper plate 61 may be preassembled and the mandrels inserted in the openings prior to mating such assembly to the lower mold block 59. In this manner, such mandrels are held in proper position during the initial curing and setting of the binder. After the articles ar sufficiently rigidfied, platen 66 may be removed and the mold parts separated, whereupon the molded points are readily removed from the mold cavities in flexible mold block 59. Such points may then be further cured to final condition.

Since shanks or mandrels must be precisely centered in the mold cavities (inasmuch as the mounted points, etc. produced will be rotated at extremely high speeds), the holes in the mold parts for receiving them should either be in the same part having the principal mold cavity or should be in a rigid mold part registering therewith. This serves to index such mandrels properly, and the rigid mold part is so assembled with the elastomeric mold part as to rigidify the entire assembly as a unit during the molding operation. The main mold cavity may desirably be in the flexible elastomeric part of the two-part mold to facilitate unmolding of the product.

It will be seen from the foregoing that new and improved methods of producing a variety of different types of molds are described utilizing highly preheated particulate materials, especially granular materials such as sand, and a highly heated highly liquid therosetting resin binder. Not only are such methods relatively quick and easy to use, but molds having new and superior characteristics are achieved for many different purposes.

Other modes of applying the principle of the invention may be employed, change being made as regards the details described, provided the feaures stated in any of the following claims or the equivalent of such be employed.

I claim:
1. The method of making molded abrasive articles comprising thermoset resins and discrete abrasive particles which comprises the steps of
   (a) preheating a thermosetting organic resin and a catalyst for the resin to a temperature sufficient to reduce the viscosity of the resin and catalyst to less than 10 centipoises, the amount of resin and catalyst being at least 2.5% by volume in excess of that required to fill the interstices between the abrasive particles,
   (b) preheating the discrete abrasive particles to a temperature above about 60° C.,
   (c) mixing such heated abrasive particles with such preheated resin-catalyst mixture with agitation to wet such abrasive particles with the resin-catalyst mixture and release gas bubbles to form a flowable mixture free of abrasive particle agglomerations,
   (d) discharging said flowable mixture into an open mold permitting continued release and escape of gas bubbles from such resin-catalyst and the particles in such mixture to settle to concentrate such particles closely together with the interstices therebetween substantially filled with such resin-catalyst mixture and thereby forming a thin upper superficial layer of substantially abrasive-free resin catalyst mixture above such concentrated particles in such mold, and
   (e) curing the mixture in the mold to a solid article of desired shape.
2. The method of claim 1 wherein the thin superficial layer is machined off from the cured article obtained in step (e).
3. The method of claim 1 wherein the mold is vibrated to settle and concentrate such particles prior to curing in step (e).
4. The method of claim 3 wherein such particles are thus concentrated at least as closely as the dry pack density thereof.
5. The method of claim 2 wherein the resin-catalyst mixture is employed in an amount of from about 2.5% to about 10% by volume in excess of that required to fill the interstices between such particles.
6. The method of claim 1 wherein said resin is an epoxy resin.
7. The method of claim 6 wherein such mold is shaped to form an abrasive wheel, and the thin superficial layer of substantially abrasive-free resin is subsequently machined off from the side of the cured abrasive wheel thus produced.

* * * * *